United States Patent
Ishii et al.

(10) Patent No.: US 6,872,333 B2
(45) Date of Patent: Mar. 29, 2005

(54) ENIC COMPOUNDS, SULFUR-CONTAINING POLYENIC COMPOUND, SULFUR-CONTAINING POLYTHIOL COMPOUND, HIGH REFRACTIVE INDEX PHOTOCURABLE COMPOSITION AND CURED PRODUCT THEREOF

(75) Inventors: Kenji Ishii, Tokyo (JP); Hitoshi Okazaki, Tokyo (JP); Mitsuteru Kondo, Tokyo (JP); Masaaki Takasuka, Tokyo (JP); Motoharu Takeuchi, Tokyo (JP)

(73) Assignee: Mitsubishi Gas Chemical Company, Ltd., Tokyo (JP)

( * ) Notice: Subject to any disclaimer, the term of this patent is extended or adjusted under 35 U.S.C. 154(b) by 111 days.

(21) Appl. No.: 10/359,271

(22) Filed: Feb. 6, 2003

(65) Prior Publication Data

US 2003/0195270 A1 Oct. 16, 2003

(30) Foreign Application Priority Data

Feb. 7, 2002 (JP) .................. 2002-030616
Oct. 21, 2002 (JP) .................. 2002-305532
Dec. 5, 2002 (JP) .................. 2002-354195

(51) Int. Cl.$^7$ .............. C08G 75/04; B29D 11/00; G02B 1/04

(52) U.S. Cl. .............. 264/1.1; 264/1.24; 264/1.31; 264/1.36; 264/1.37; 264/1.38; 264/496; 430/7; 430/321; 522/180; 528/360; 528/374; 528/376

(58) Field of Search .......... 522/180; 528/376, 528/374, 360; 430/321, 7; 264/496, 1.1, 1.24, 1.31, 1.32, 1.36, 1.37, 1.38

(56) References Cited

U.S. PATENT DOCUMENTS

| | | | | | |
|---|---|---|---|---|---|
| 5,753,730 | A | * | 5/1998 | Nagata et al. | 524/136 |
| 5,969,867 | A | * | 10/1999 | Fukushima et al. | 359/581 |
| 6,153,663 | A | * | 11/2000 | Chen et al. | 522/181 |
| 6,184,323 | B1 | * | 2/2001 | Jiang | 526/286 |
| 6,313,251 | B1 | * | 11/2001 | Toh et al. | 526/308 |
| 6,596,841 | B2 | * | 7/2003 | Tanaka et al. | 528/374 |

FOREIGN PATENT DOCUMENTS

| | | |
|---|---|---|
| EP | 0 329 387 A2 * | 8/1989 |
| EP | 0 394 495 A1 * | 10/1990 |
| JP | 01-197528 * | 8/1989 |

* cited by examiner

*Primary Examiner*—Susan Berman
(74) *Attorney, Agent, or Firm*—Wenderoth, Lind & Ponack, L.L.P.

(57) ABSTRACT

A composition containing 3,3'-thiobis(propane-1,2-dithiol) and one or more enic compounds which composition is photocurable and can give a cured product having a high refractive index and adequate hardness.

8 Claims, No Drawings

ENIC COMPOUNDS, SULFUR-CONTAINING POLYENIC COMPOUND, SULFUR-CONTAINING POLYTHIOL COMPOUND, HIGH REFRACTIVE INDEX PHOTOCURABLE COMPOSITION AND CURED PRODUCT THEREOF

FIELD OF THE INVENTION

The present invention relates to a novel sulfur-containing polyenic compound, a sulfur-containing polythiol compound and photocurable compositions of these, which are useful for optical materials such as a spectacle lens, a prism, an optical fiber, an information recording substrate and a filter and useful for coating materials, adhesives and encapsulants for optical materials and relates to high-refractive-index cured products obtainable from the above photocurable compositions.

BACKGROUND OF THE INVENTION

In optical material fields, recently, plastic materials are used a lot for optical materials, such as a spectacle lens, a prism, an optical fiber, an information recording substrate and a filter, and for coating materials and adhesives for the optical materials, since they are lightweight and are abundant in toughness. Particularly, with respect to materials for a spectacle lens a coating layer, an optical filter and the like, a plastic material having a high refractive index is required.

As a material having a high refractive index, there are proposed a copolymer of a polythiol compound and a polyisocyanate (JP-B-4-58489, JP-B-5-148340), a ring-opened polymer of a polyepisulphide compound (JP-A-9-110979), a polyenic compound (JP-A-9-110983), a poly(thio)isocyanate compound (JP-A-9-110955, JP-A-6-5323) and a polyepisulfide compound (JP-A-10-298287). However, heat-curing is a method for molding these materials and problems are that a molding time is long and that molding at low temperatures is difficult. Therefore, there are increasingly required photocurable materials which are moldable by molding in a short time and molding at a low-temperature. Since a polythiol compound does not have self-polymerizability, the compounding amount thereof is limited. Further, when the compounding amount of the polythiol compound increases, a problem is that an obtained cured product becomes flexible due to a sulfide bond (—S—) formed at the time of polymerization.

As an example of a photocurable resin having a high refractive index, a resin (to be referred to as "enic-thiol resin" hereinafter) formed of a combination of an enic compound and a thiol compound is proposed. Since the thiol compound has a sulfur atom having a high atom refractive index in a molecule, a cured product obtained therefrom has a high refractive index. Further, the cured product has high impact resistance thanks to addition linkage of a thiol group and an unsaturated group. However, when the content of the thiol compound is increased for increasing the refractive index sufficiently, an obtained cured product becomes a rubbery state so that sufficient hardness can not be obtained. For obtaining a cured product having a high refractive index and high hardness, there has been demanded a polyfunctional, preferably tetrafunctional or more functional, polythiol which has a sufficiently high refractive index and is easily apt to form a crosslinking structure.

Further, concerning the enic compound being a partner of the thiol compound, it is required to select an adequate compound in consideration of a balance of photocurable properties, hardness, or the like, in addition to the refractive index.

Polyenic compounds having two or more reactive double bonds such as an acryloyl group, a methacryloyl group, a vinyl group or an allyl group are enumerated as a photocurable material. However, for example, generally-known epoxy acrylate (JP-A-8-176243) or urethane acrylate (JP-A-5-134101) has a defect of a low refractive index. Therefore, polyenic compounds having higher refractive index have been required.

SUMMARY OF THE INVENTION

It is an object of the present invention to provide a photocurable composition having a high refractive index and adequate hardness and a high refractive index cured product obtained therefrom.

It is another object of the present invention to provide a polyenic compound having a high refractive index and high crosslinking properties and to provide a polymerizable composition containing the above polyenic compound and a cured product thereof.

It is further another object to provide a polythiol compound which has a high sulfur content for increasing refractive index and has a large molecular weight per thiol group for increasing the compounding amount of a thiol compound in a polymerizable composition, a polymerizable composition containing the above polythiol compound and a cured product thereof.

The present invention 1 provides a photocurable composition containing 3,3'-thiobis(propane-1,2-dithiol) of the formula (1),

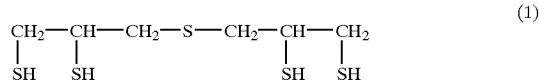

one or more enic compounds and one or more photoradical polymerization initiators.

The present invention 1 further provides a photocurable composition according to the above, wherein the one or more enic compounds contain a bifunctional or higher functional polyenic compound represented by the formula (2),

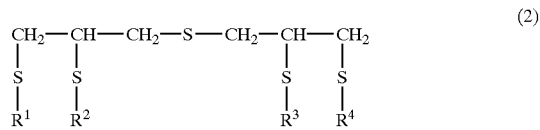

(in which each of $R^1$ to $R^4$ is a hydrogen atom or any one of groups in the formula (3),

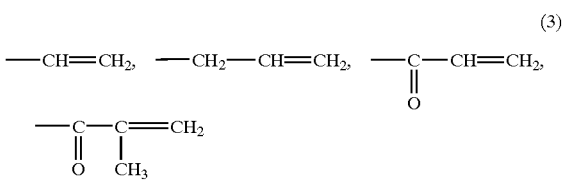

and a group of the formula (4),

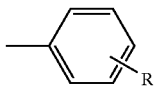
(4)

in which R is a hydrogen atom or an alkyl group having 1 to 5 carbon atoms,
provided that at least two of $R^1$ to $R^4$ are any one group in the formula (3) and that $R^1$ and $R^2$ or $R^3$ and $R^4$ do not represent a group of the formula (4) simultaneously), divinylbenzene or bis(4-methacroyl-thiophenyl)sulfide represented by the formula (5),

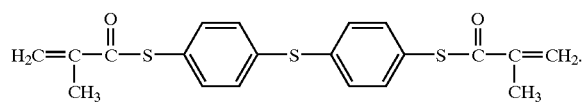
(5)

The present invention 1 further provides a cured product of the above composition and an optical material obtained from the cured product.

The present invention 2 provides a sulfur-containing polyenic compound represented by the formula (15),

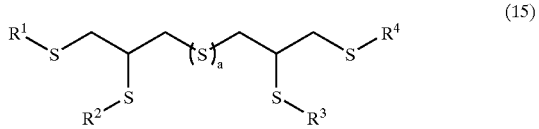
(15)

(wherein a is an integer of 1 or 2, and $R^1$ to $R^4$ are a hydrogen atom or an organic residue having 0 to 20 carbon atoms, provided that at least two of $R^1$ to $R^4$ are an aliphatic group or an aromatic group which has a reactive double bond)

The present invention 2 further provides a polymerizable composition containing the above sulfur-containing polyenic compound, a cured product of the polymerizable composition and an optical material obtained from the above cured product.

The present invention 3 provides a sulfur-containing polythiol compound represented by the formula (40),

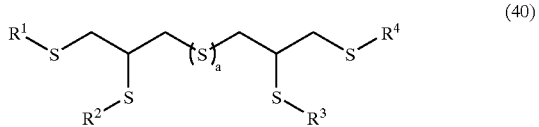
(40)

(wherein a is an integer of 1 or 2 and $R^1$ to $R^4$ are a hydrogen atom, an aliphatic group, an aromatic group, an alicyclic group or a heterocyclic ring and may have a structure having a thiol group, provided that at least two of $R^1$ to $R^4$ are a hydrogen atom or an aliphatic group having a thiol group, an aromatic group having a thiol group, an alicyclic group having a thiol group or a heterocyclic ring having a thiol group and that all of $R^1$ to $R^4$ are not a hydrogen atom at the same time).

The present invention 3 further provides a polymerizable composition containing the above sulfur-containing polythiol compound, a cured product of the polymerizable composition and an optical material obtained from the above cured product.

DETAILED DESCRIPTION OF THE INVENTION

According to the present invention 1, since a polythiol compound, i.e. 3,3'-thiobis(propane-1,2-dithiol), represented by the formula (1) has a high sulfur content of 65% as a weight proportion and thus has a high refractive index and it is tetrafuctional and thus is highly crosslikable, there can be obtained a cured product having adequate hardness. According to the present invention 1, further, there can be obtained a cured product having a proper balance of refractive index, photocurable properties and hardness by selecting a compound of the formula (2), divinyl benzene or the formula (5) as an enic compound.

The above 3,3'-thiobis(propane-1,2-dithiol) can be easily synthesized by a known production process or a production process for a mercapto compound. For example, it can be produced by the method disclosed in the specification of Japanese Patent Application No. 2001-209031. That is, it can be obtained by reacting bis(β-epithiopropyl) sulfide with hydrogen sulfide in the presence of a base.

The enic compound(s) contained in the photocurable composition of the present invention refer to a compound having a reactive unsaturated bond group at a terminal. Concretely, it includes vinyl compounds, allyl compounds, acrylic compounds and methacrylic compounds.

Concrete examples of the vinyl compounds include vinyl ether, ethyl vinyl ether, isobutyl vinyl ether, 2-ethylhexylvinylether, phenyl vinyl ether, benzyl vinyl ether, 2-chloroethylvinylether, cyclohexyl vinyl ether, vinyl glycidyl ether, vinyl alcohol, methylvinyl carbinol, ethylene glycol monovinyl ether, ethylene glycol divinyl ether, diethylene glycol monovinyl ether, diethylene glycol divinyl ether, tetramethylene glycol monovinyl ether, divinyl sulfide, vinyl ethyl sulfide, vinyl phenyl sulfide, methyl vinyl ketone, divinyl dicarbonate, vinyl diglycol carbonate, vinylene carbonate, vinyl acetate, vinyl chloroacetate, vinyl propionate, vinyl butyrate, vinyl hexanoate, vinyl 2-ethylhexanoate, divinyl adipate, vinyl benzoate, vinyl salicylate, vinyl acrylate, vinyl methacrylate, vinyl bromide, vinyl iodide, vinyl phosphate, vinylurea, styrene, 2-methylstyrene, 3-methylstyrene, 4-methylstyrene, α-methylstyrene, 2,4,6-trimethylstyrene, 4-t-butylstyrene, stilbene, vinylphenol, 3-vinylbenzyl alcohol, 4-vinylbenzyl alcohol, 2-(4-vinylphenylthio)ethanol, 2-(3-vinylphenylthio)ethanol, 2-(4-vinylbenzylthio)ethanol, 2-(3-vinylbenzylthio)ethanol, 1,3-bis(4-vinylbenzylthio)-2-propanol, 1,3-bis(3-vinylbenzylthio)-2-propanol, 2,3-bis(4-vinylbenzylthio)-1-propanol, 2,3-bis(3-vinylbenzylthio)-1-propanol, cinnamyl alcohol, cinnamaldehyde, 1,3-divinylbenzene, 1,4-divinylbenzene, trivinylbenzene, divinylphthalate, 2-chlorostyrene, 3-chlorostyrene, 4-chlorostyrene, 3-chloromethylstyrene, 4-chloromethylstyrene, 4-aminostyrene, 3-cyanomethylstyrene, 4-cyanomethylstyrene, 4-vinylbiphenyl, 2,2'-divinylbiphenyl, 4,4'-divinylbiphenyl, 2,2'-distyryl ether, 4,4'-distyryl ether, 2,2'-distyrylsulphide, 4,4'-distyrylsulphide, 2,2-bis(4-vinylphenyl)propane, bis(4-vinylphenyl)ether and 2,2-bis(4-vinyloxyphenyl)propane, while the vinyl compounds shall not be limited thereto.

Concrete examples of the allyl compounds include compounds obtained by substituting part or all of vinyl groups of the above compounds described in the examples of the vinyl compounds with allyl groups, while the allyl compounds shall not be limited thereto.

Concrete examples of the acrylic compounds include methylacrylate, ethylacrylate, propylacrylate, butylacrylate, cyclohexylacrylate, 2-hydroxyethyl acrylate, 3-hydroxypropyl acrylate, 2-hydroxypropyl acrylate, 3-phenoxy-2-hydroxypropylacrylate, trimethylol propane monoacrylate, 2-hydroxyethyl isocyanurate monoacrylate, 2-hydroxyethyl isocyanurate diacrylate, 2-hydroxyethyl cyanurate monoacrylate, 2-hydroxyethyl cyanurate diacrylate, ethylene glycol diacrylate, diethylene glycol diacrylate, 1,3-butylene glycol diacrylate, triethylene glycol diacrylate, polyethylene glycol diacrylate, propylene glycol diacrylate, 1,3-propanediol diacrylate, 1,3-butanediol diacrylate, 1,4-butanediol diacrylate, 1,6-hexanediol diacrylate, neopentyl glycol diacrylate, polypropylene glycol diacrylate, 2-hydroxy-1,3-diacryloxypropane, 2,2-bis[4-(acryloxyethoxy)phenyl]propane, 2,2-bis[4-(acryloxyethoxy)cyclohexyl]propane, 2,2-bis[4-(2-hydroxy-3-acryloxypropoxy)phenyl]propane, 2,2-bis[4-(acryloxy•diethoxy)phenyl]propane, 2,2-bis[4-(acryloxy•polyethoxy)phenyl]propane, trimethylol propane triacrylate, pentaerythritol monoacrylate, pentaerythritol diacrylate, pentaerythritol triacrylate, pentaerythritol tetraacrylate, pentaacrylate of bis(2,2,2-trimethylolethyl) ether, hexaacrylate of bis(2,2,2-trimethylolethyl)ether, and bis(4-acryloylthiophenyl)sulfide, while the acrylic compounds shall not be limited thereto.

Concrete examples of the methacrylic compounds include compounds obtained by substituting part or all of acrylic groups of the above compounds described in the examples of the acrylic compounds with methacrylic groups, while the methacrylic compounds shall not be limited thereto.

Examples of other enic compounds include bifunctional or more functional polyenic compounds represented by the formula (2),

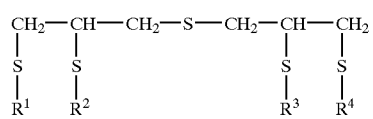

(wherein each of $R^1$ to $R^4$ is a hydrogen atom or any one group in the formula (3)

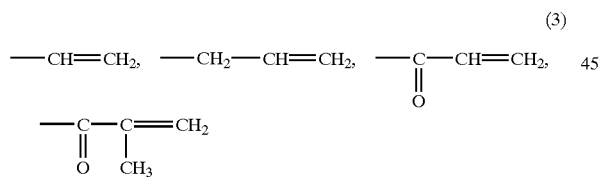

or a group of the formula (4)

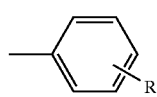

in which R is a hydrogen atom or an alkyl group having 1 to 5 carbon atoms, provided that at least two of $R^1$ to $R^4$ are any one of the groups of the formula (3) and that $R^1$ and $R^2$ or $R^3$ and $R^4$ are not simultaneously a group of the formula (4)).

Typical concrete examples of the polyenic compound represented by the formula (2) will be shown hereinafter, while the polyenic compounds shall not be limited to these examples.

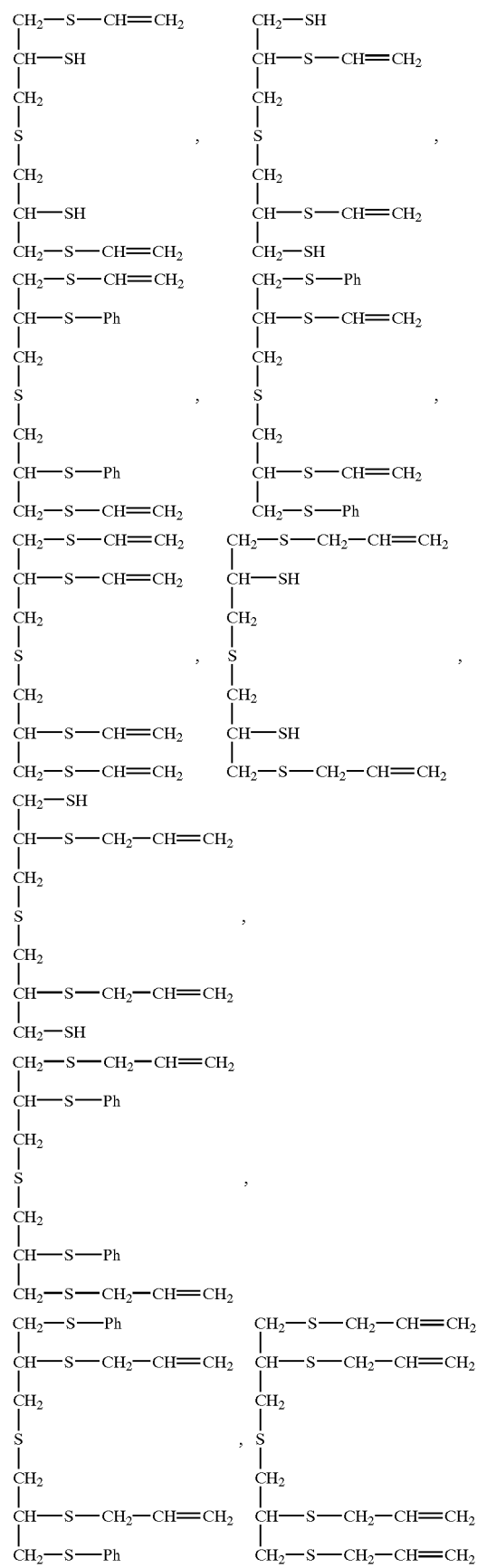

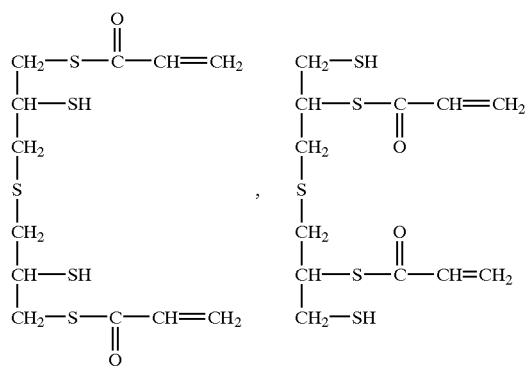

In the above formulae, Ph is a phenyl group.

Of the above concrete examples of the enic compound, in view of the balance of refractive index, curable properties and hardness, particularly preferred are divinylbenzene and bis(4-methacryloylthiophenyl)sulfide represented by the formula (5), (5)

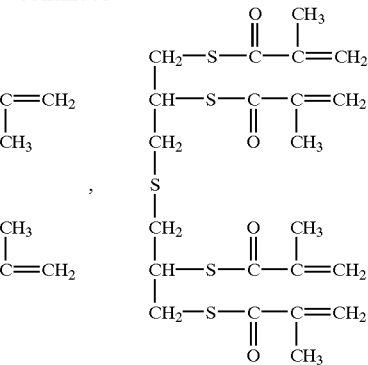

and the compounds represented in the formula (7), (7)

These compounds may be used in combination. Further, an enic compound other than the above compounds may be added for adjusting refractive index, curable properties, hardness, etc.

A synthesis method for the polyenic compound of the formula (2) is not specially limited. For example, it can be produced by reacting, in the presence of a base, a bifunctional or more functional polythiol compound represented by the formula (8),

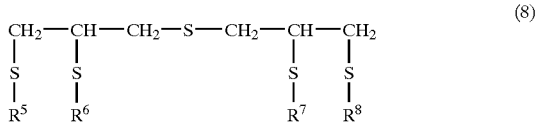

(wherein each of R⁵ to R⁷ is a hydrogen atom or a group of the formula (4),

in which R is a hydrogen atom or an alkyl group having 1 to 5 carbon atoms,
provided that at least two of R⁵ to R⁸ are a hydrogen atom and that R⁵ and R⁶ or R⁷ and R⁸ are not simultaneously a group of the formula (4)),
with one or more halogen derivatives represented by the formula (9),

(wherein R' is any one group in the formula (3),

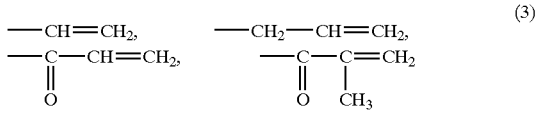

and X is a halogen atom).
In this case, the base may be present in the form of a salt which is formed with the compound of the formula (8).

The ratio of the enic compounds to 3,3'-thiobis(propane-1,2-dithiol contained in the photocurable composition of the present invention is in the range of 1.0 to 10, preferably 1.0 to 5, more preferably 1.0 to 3, as a functional group molar ratio of (unsaturated bond group)/(thiol group).

The photoradical polymerization initiator contained in the photocurable composition of the present invention is not specially limited, and known photoradical polymerization initiators may be used. Further, two or more photoradical polymerization initiators may be used in combination.

Typical concrete examples of the photoradical polymerization initiator include acetophenone, trichloroacetophenone, 2-hydroxy-2-methyl-propiophenone, 1-hydroxycyclohexyl phenyl ketone, benzoin methyl ether, benzoin ethyl ether, benzoin isobutyl ether, benzoin isopropyl ether, 2,2-diethoxyacetophenone, 2,2-dimethoxy-2-phenylacetophenone, 1-[4-(2-hydroxyethoxy)phenyl]-2-hydroxy-2-methyl-1-propane-1-one, 2-benzyl-2-dimethylamino-1-(4-morpholinophenyl) butanone-1,2-methyl-1[4-(methylthio)phenyl]-2-morpholinopropane-1-one, benzyl, methyl benzoylformate, 1-phenyl-1,2-propanedione-2-(o-benzoyl)oxime, 2,4,6-trimethylbenzoyldiphenylphosphine oxide, 2,4,6-trimethylbenzoylphenylethoxyphosphine oxide, bis(2,4,6-trimethylbenzoyl)-phenylphosphine oxide, benzophenone, methyl o-benzoyl benzoate, [4-(methylphenylthio)phenyl] phenylmethane, 4,4'-bisdiethylaminobenzophenone, 1,4-dibenzoylbenzene, 2-benzoylnaphthalene, 4-benzoyldiphenyl, 4-benzoyldiphenyl ether, xanthone, thioxanthone, isopropyl thioxanthone, 2,4-dimethylthioxanthone, 2-chlorothioxanthone, ethylanthraquinone and 10-butyl-2-chloroacridone, while the photoradical polymerization initiator shall not be limited thereto.

The content of the photoradical polymerization initiator in the photocurable composition of the present invention is in the range of 0.001 to 10 parts by weight, preferably 0.005 to 5 parts by weight, per 100 parts by weight of the total amount of 3,3'-thiobis(propane-1,2-dithiol and the enic compound(s).

The photocurable composition of the present invention may contain a sensitizer, an ultraviolet absorber, a thermal radical polymerization initiator, an antioxidant, a yellowing inhibitor, a blueing agent, a pigment, a releasing agent, an adherence agent and the like, as required, in such a range that effects of the present invention are not impaired.

The high refractive index cured product of the present invention is obtained by polymerizing and curing the photocurable composition of the present invention. The curing method is a known photopolymerization. A known heat-curing may be used in combination as required.

As a light source usable for photo-curing of the photocurable composition of the present invention, there are used a low-pressure mercury lamp, a high pressure mercury lamp, an extra-high pressure mercury lamp, a metal halide lamp, and the like.

The sulfur-containing polyenic compound represented by the present invention 2 has a high refractive index, since it contains five or more sulfur atoms in one molecule. Further, since it has four functional groups at the maximum, it is excellent in crosslinking properties, so that it is usefull as a high refractive index curable material. The present invention 2 will be explained hereinafter.

(Explanations of Polyecnic Compound)

The sulfur-containing polyenic compound of the present invention is a novel compound represented by the formula (15). The above sulfur-containing polyenic compound is characterized in that it contains five or more sulfur atoms and is thus high in refractive index. Further, it is characterized in that it has 2 to 4 reactive double bonds and 0 to 2 thiol groups and is thus high in crosslinking density at the time of polymerization.

(Synthesis Method)

A method of synthesizing the sulfur-containing polyenic compound of the formula (15) is not specially limited. For example, it can be synthesized by a thio-esterification reaction between a thiol compound and a halide or a ring-opening addition reaction between an episulfide compound and a thiol compound or by combining these reactions. It can be efficiently synthesized by the following methods depending upon its structure.

Synthesizing method (1): The sulfur-containing polyenic compound represented by the formula (15) can be synthesized by reacting a sulfur-containing tetrathiol compound represented by the formula (17),

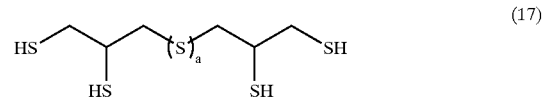

(wherein a is an integer of 1 or 2), with one to four kinds of halides represented by the formula (18),

(wherein X is a halogen atom and $R^5$ is an organic residue having 0 to 20 carbon atoms),
in the presence of a base. In this case, at least one of the halides of the formula (18) as a reaction raw material is required to contain a structure having a reactive double bond. By the above synthesizing method, particularly in the formula (15), (1) a compound wherein $R^1=R^2=R^3=R^4$, and
(2) a compound wherein $R^1=R^4=$ and $R^2=R^3=H$
can be efficiently synthesized.

Synthesizing method (2): A compound of the formula (15) wherein $R^2=R^3=H$ can be synthesized by reacting a sulfur-containing diepisulfide compound represented by the formula (19),

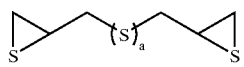

(wherein a is an integer of 1 or 2),
with one or two kinds of thiol compounds represented by the formula (20),

(wherein $R^6$ is an organic residue having 0 to 20 carbon atoms),
in the presence of a base. In this case, at least one of the thiol compounds of the formula (20) as a reaction raw material is required to contain a structure having a reactive double bond. By the above synthesizing method, particularly, a compound of the formula (15) in which $R^1=R^4$ and $R^2=R^3=H$ can be efficiently synthesized.

Synthesizing method (3): A compound of the formula (15), in which $R^1 \neq H$, $R^4 \neq H$ and at least one of $R^2$ and $R^3$ is an organic structure having 0 to 20 carbon atoms other than hydrogen, can be synthesized by reacting a sulfur-containing diepisulfide compound of the formula (19) with one or two kinds of thiol compounds of the above formula (20) in the presence of a base to obtain a reaction product and then reacting the reaction product with one or two kinds of halides of the above formula (18) in the presence of a base. In this case, at least one of the thiol compounds of the formula (20) and the halides of the formula (18) as reaction raw materials is required to contain a structure having a reactive double bond. By this synthesizing method, particularly, a compound of the formula (15), in which $R^1=R^4\neq H$ and $R^2=R^3\neq H$, can be efficiently synthesized.

Examples of the halide of the formula (18) include vinyl chloride, vinyl bromide, allyl chloride, allyl bromide, acryloyl chloride, acryloyl bromide, methacryloyl chloride, methacryloyl bromide, chlorostyrene, bromostyrene, chloromethylstyrene, bromomethylstyrene, chloroethylstyrene, bromoethylstyrene, chlorobenzene, bromobenzene, chloromethylbenzene, bromomethylbenzene, chloroethylbenzene and bromoethylbenzene.

Examples of the thiol compound of the formula (20) include vinyl mercaptan, allyl mercaptan, thioacrylic acid, thiomethacrylic acid, mercaptostyrene, mercaptomethylstyrene, mercaptoethylstyrene, mercaptobenzene, mercaptomethyl benzene and mercaptoethyl benzene.

In the thio-esterification reaction between the thiol compound and the halide, (1) the halide of the formula (18) as a reaction raw material is preferably a chloride. The total amount of the halides is 1.0 to 5.0 equivalents, preferably 1.2 to 2.0 equivalents, based on 1 equivalent of a thiol group. When it exceeds 5.0, an unreacted halide remains in a large amount so that it is undesirable in terms of cost. When it is smaller than 1.0, unreacted thiol groups remain in a large amount, undesirably, which decreases a yield. However, when it is intended to obtain a thiol-group-containing compound of the formula (15) in which at least one of $R^1$ to $R^4$ is hydrogen, the amount of the halides may be intentionally decreased.

(2) Although the base to be used is selected depending upon the reaction raw materials and therefore it can not be absolutely limited, it includes alkali metal salts such as sodium hydroxide, potassium hydroxide, sodium methoxide and sodium ethoxide, and amines such as trimethylamine, triethylamine and pyridine. The amount of the base is 1.0 to 5.0 equivalents, preferably 1.2 to 2.5 equivalents, based on 1 equivalent of a thiol group. When it is larger than 5.0, an unreacted base remains in a large amount so that it is undesirable in terms of cost. When it is smaller than 1.0, unreacted thiol groups remain in a large amount, undesirably, which decreases a yield. However, when it is intended to obtain a thiol-group-containing compound of the formula (15) in which at least one of $R^1$ to $R^4$ is hydrogen, the amount of the base may be intentionally decreased. Further, the base may be present in the state of a salt formed with the sulfur-containing tetrathiol compound of the formula (17).

(3) Although the reaction temperature is selected depending upon the reaction raw materials and therefore it can not be absolutely limited, it is preferably −20 to 50° C., more preferably −10 to 20° C. When it is higher than 50° C., undesirably, a side reaction of thiol groups and double bonds occurs. When it is smaller than −20° C., undesirably, the reaction rate becomes slow, which worsens productivity.

(4) A solvent is not specially limited so long as it can dissolve the reaction raw materials and has no reactivity with the raw materials. When a metal oxide such as sodium hydroxide is used as the base, the reaction may be carried out in an aqueous solution. When amines are used as the base, it is preferred to use an organic solvent. The organic solvent includes aliphatic hydrocarbons such as hexane and heptane, aromatic hydrocarbons such as benzene and toluene, ethers such as tetrahydrofuran and diethyl ether, and halogenated hydrocarbons such as dichloromethane and chloroform. These solvents may be used in combination.

In the ring-opening addition reaction of the episulfide compound and the thiol compound, (1) the total amount of the thiol compounds of the formula (20) as a reaction raw material is 1.0 to 5.0, preferably 1.2 to 2.0, based on 1 equivalent of an episulfide ring. When it exceeds 5.0, an unreacted thiol compound remains in a large amount so that it is undesirable in terms of cost. When it is smaller than 1.0, undesirably, unreacted episulfide rings remain in a large amount, which decreases a yield.

(2) Although the base to be used is selected depending upon the reaction raw materials and therefore it can not be absolutely limited, it includes alkali metal salts such as sodium hydroxide, potassium hydroxide, sodium methoxide and sodium ethoxide, and amines such as trimethylamine, triethylamine and pyridine. The amount of the base is 0.001 to 0.1, preferably 0.01 to 0.05, based on 1 equivalent of a thiol group.

(3) Although the reaction temperature is selected depending upon the reaction raw materials and therefore it can not be absolutely limited, it is preferably −20 to 50° C., more preferably −10 to 20° C.

(4) A solvent is not specially limited so long as it can dissolve the reaction raw materials and has no reactivity with the raw materials. When a metal oxide such as sodium hydroxide is used as the base, the reaction may be carried out in an aqueous solution. When amines are used as the base, it is preferred to use an organic solvent. The organic solvent includes aliphatic hydrocarbons such as hexane and heptane, alcohols such as methanol and ethanol, aromatic hydrocarbons such as benzene and toluene, ethers such as tetrahydrofuran and diethyl ether, and halogenated hydrocarbons such as dichloromethane and chloroform. These solvents may be used in combination.

CONCRETE EXAMPLES

Concrete examples of the sulfur-containing polyenic compound of the formula (15) will be shown hereinafter, while it shall not be limited thereto. Among compounds represented by the formula (15), a compound which is efficiently synthesized is a compound of the formula (15) in which R1=R4 and R2=R3, and it includes compounds represented by the following formula (21).

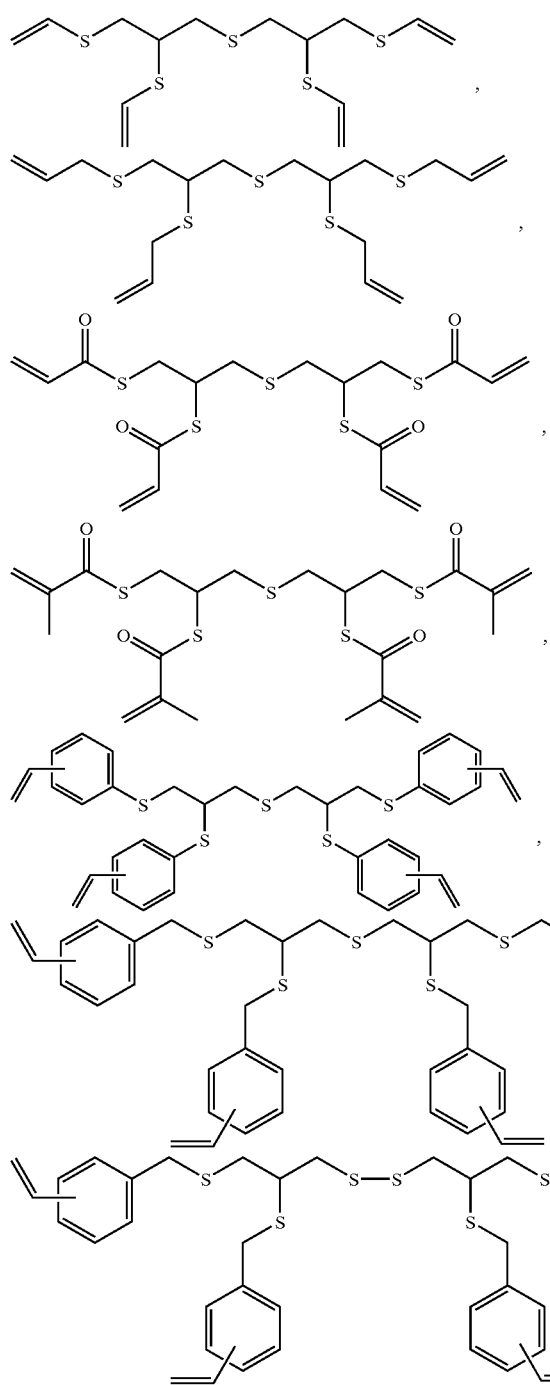

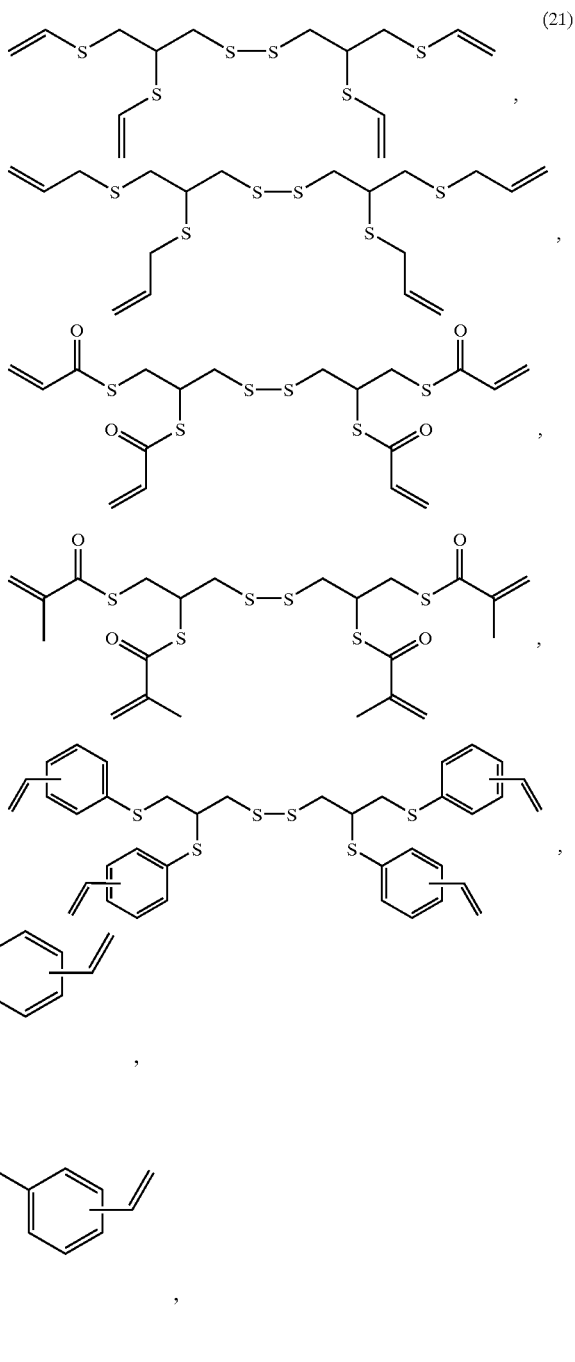

(21)

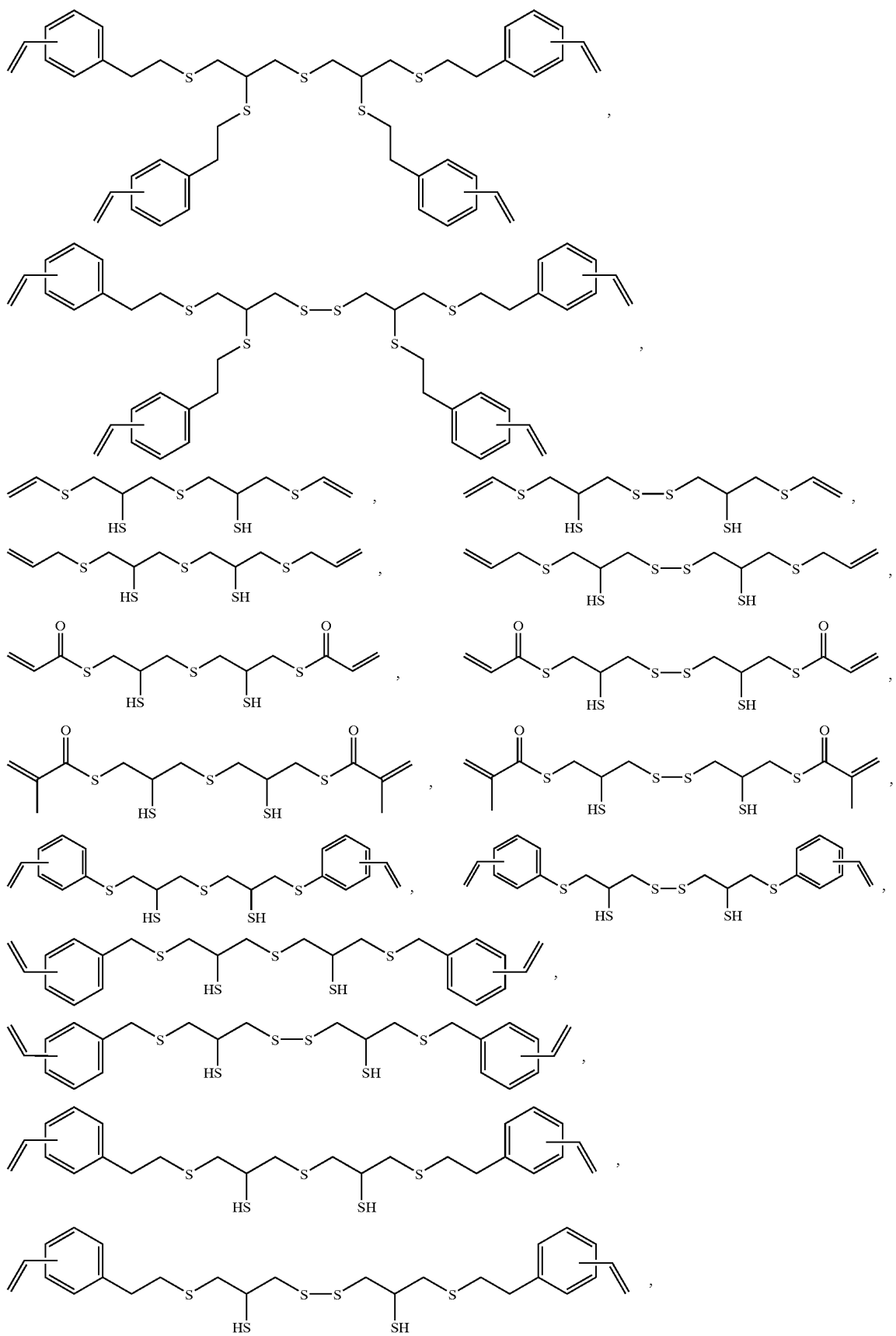

-continued
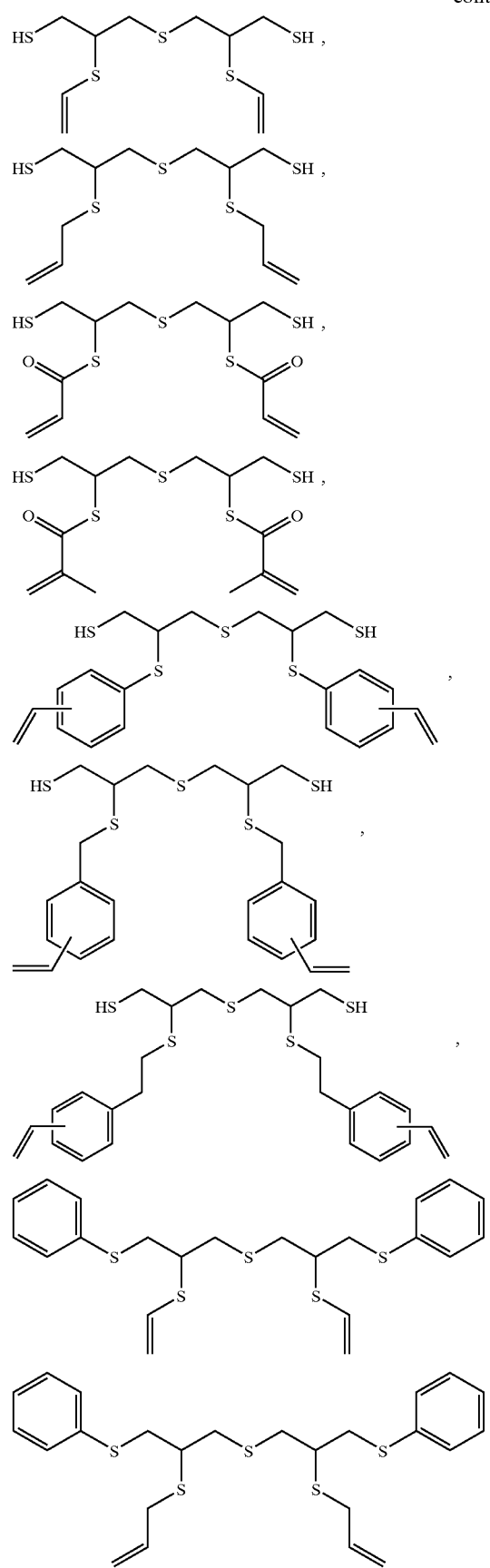
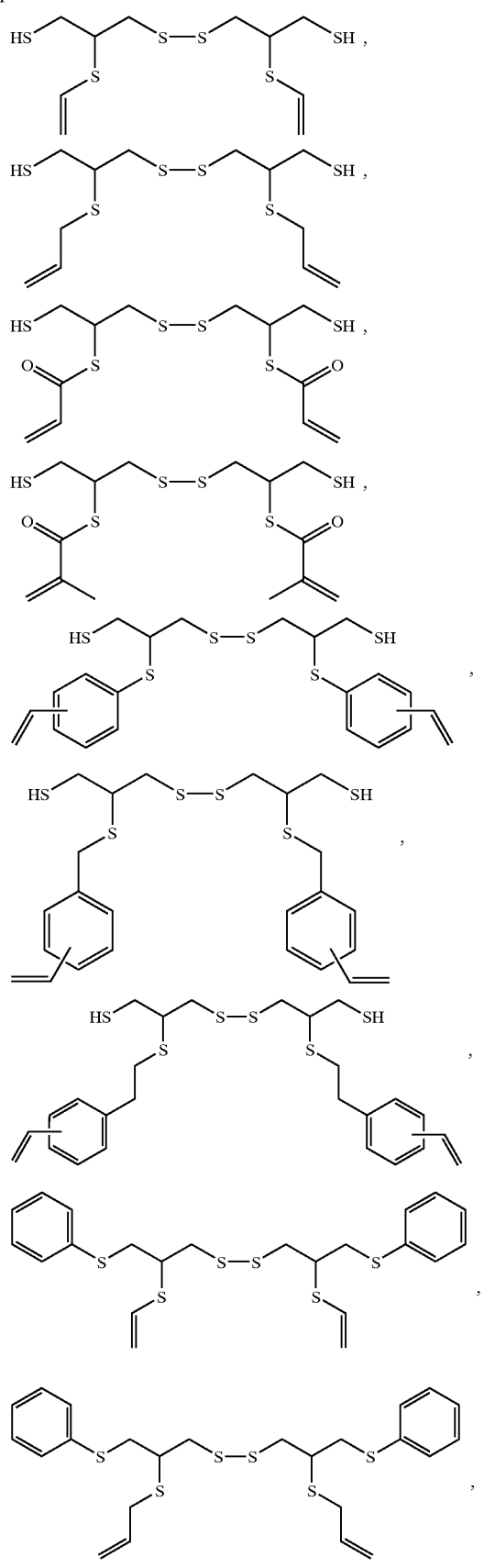

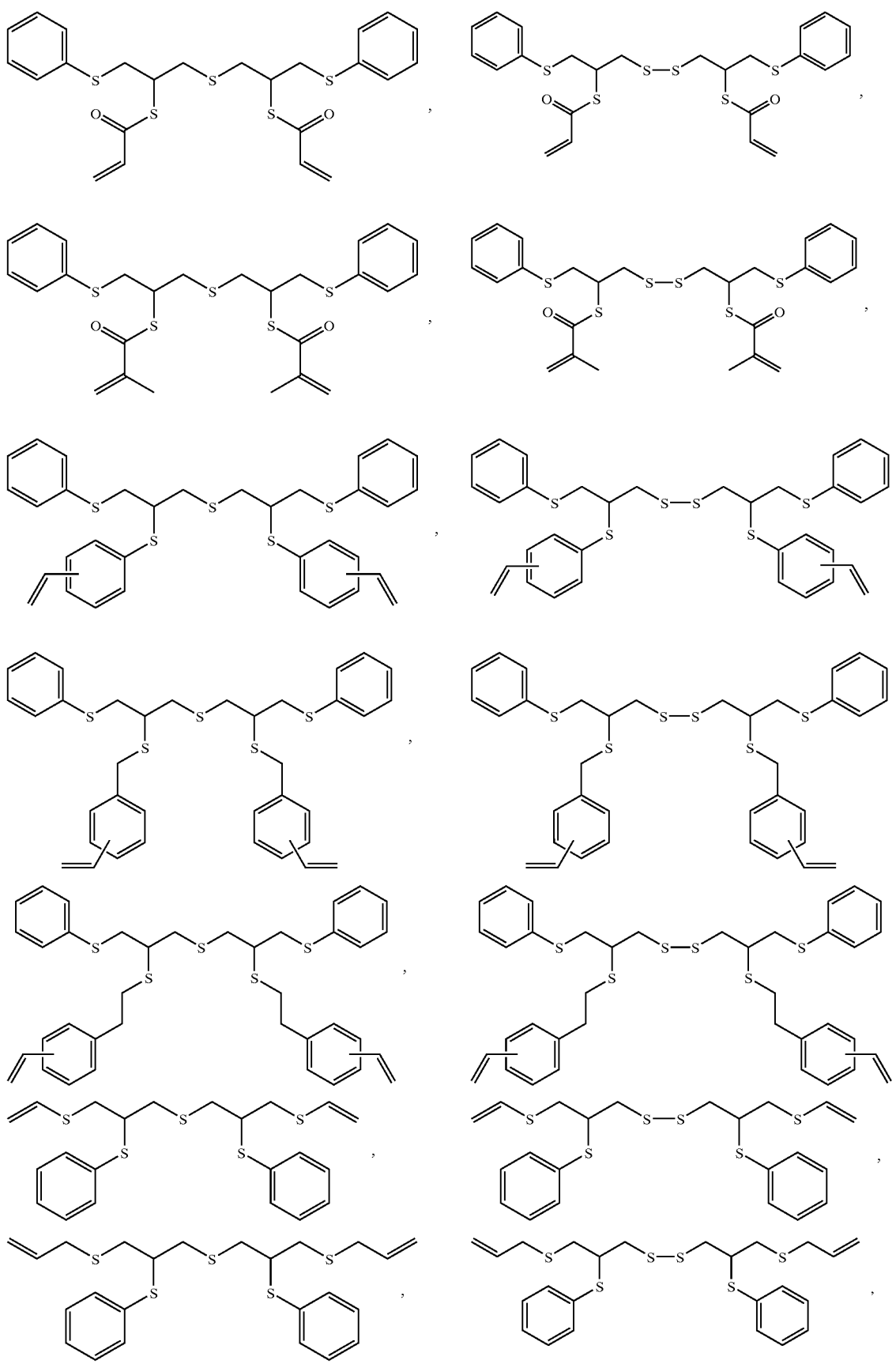

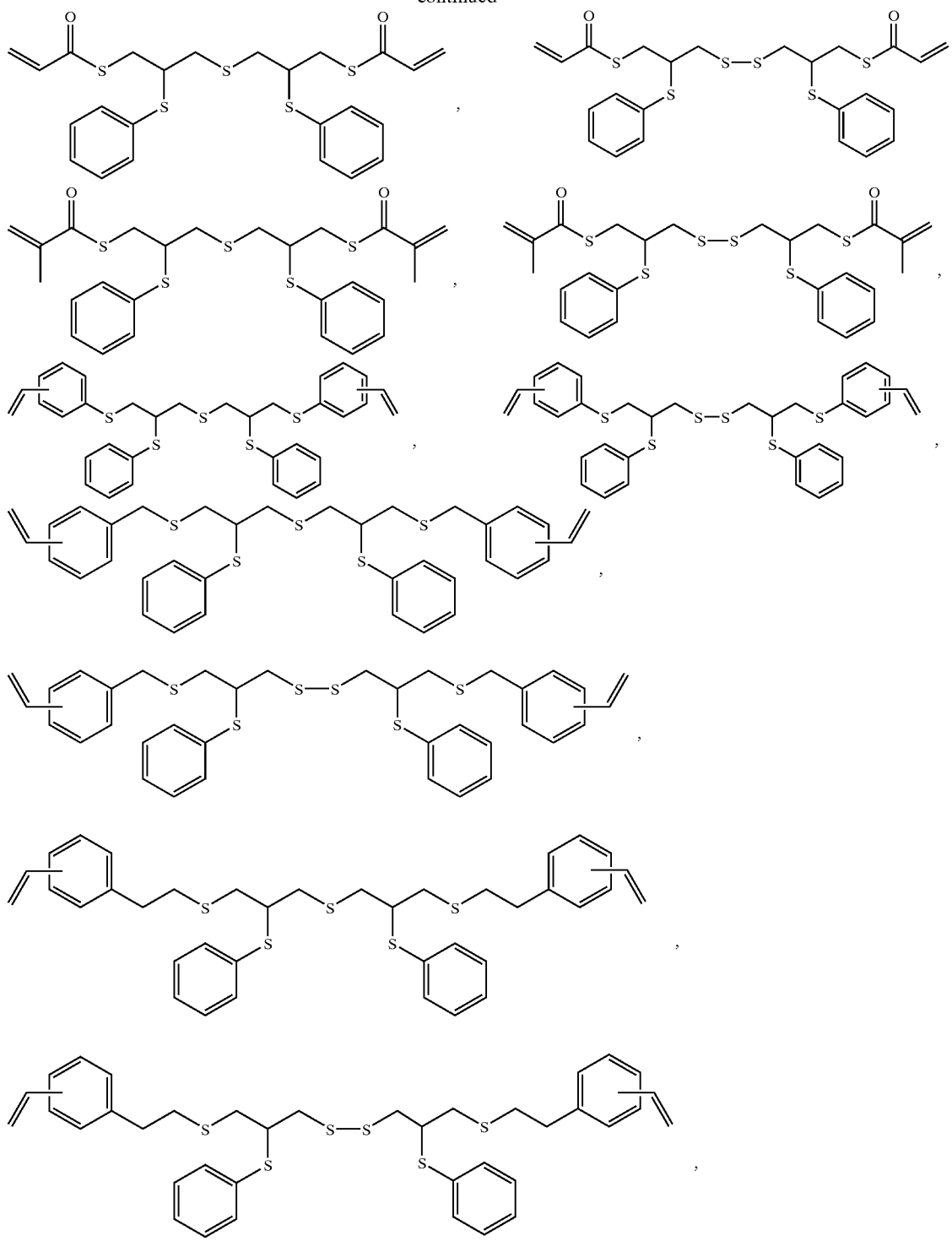

Of the above compounds, a compound which is more efficiently synthesized is, in the formula (15),
  (1) a compound in which $R^1$ to $R^4$ are the same and are any one structure of the formula (16),
  (2) a compound in which $R^1$ and $R^4$ are the same and are any one structure of the formula (16) and $R^2$ and $R^3$ are the same and are hydrogen, and
  (3) a compound in which $R^1$ and $R^4$ are the same and are a phenyl group and $R^3$ and $R^4$ are the same and are any one of the formula (16).

That is, it is compounds represented by the formula (22).

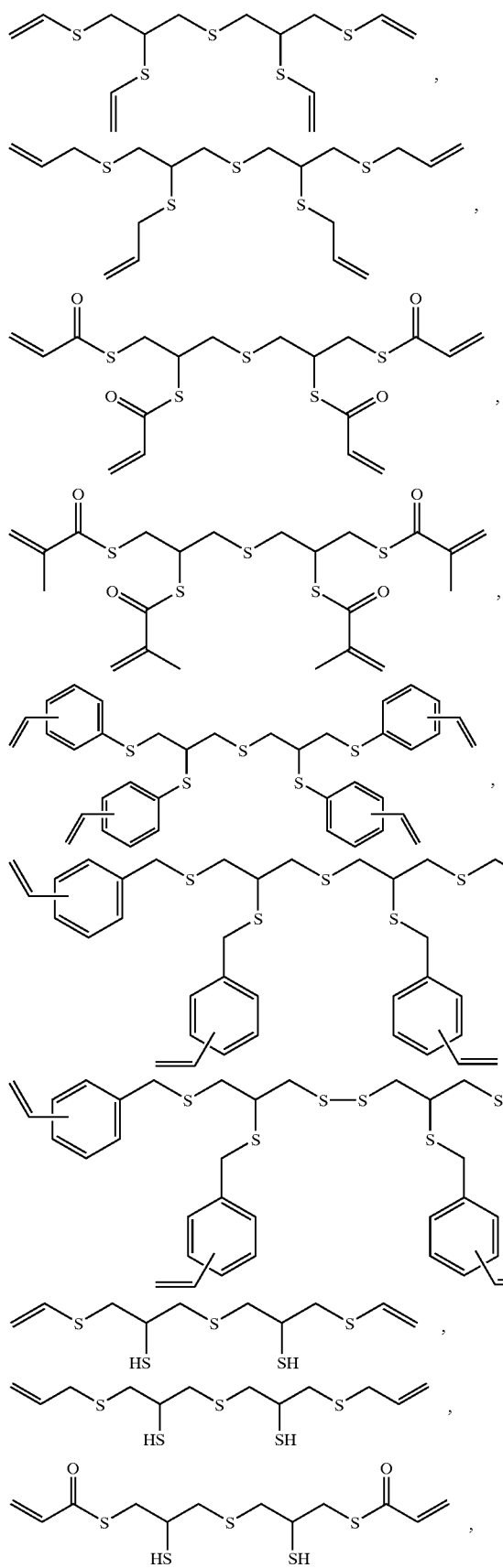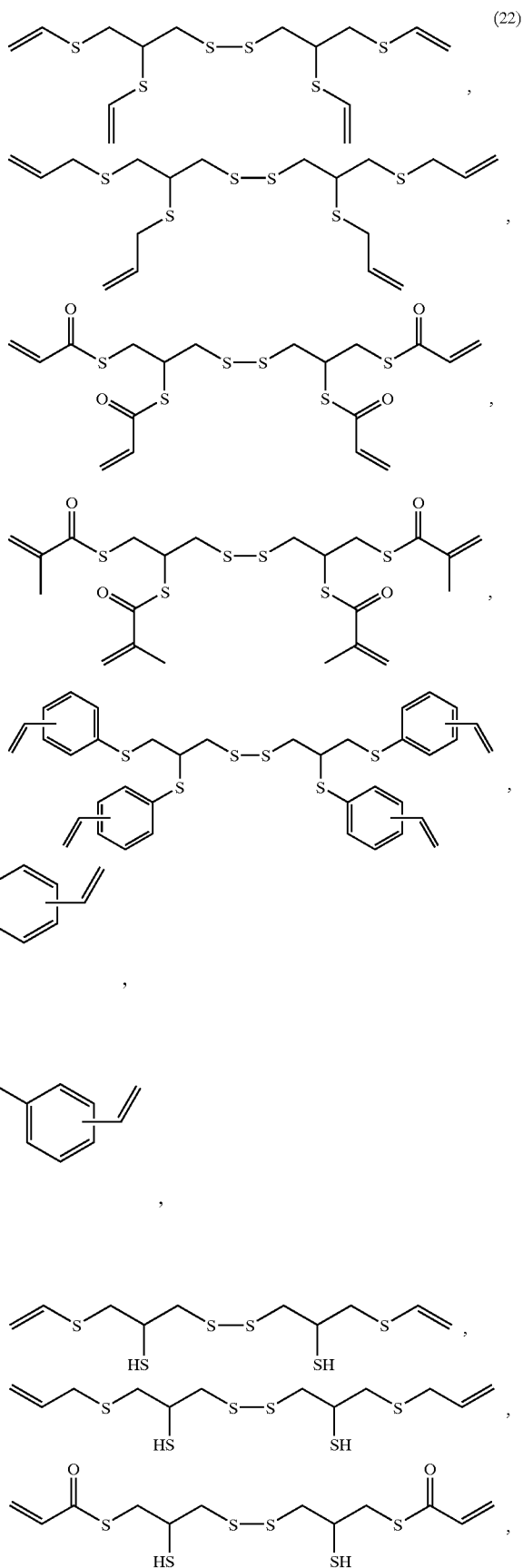

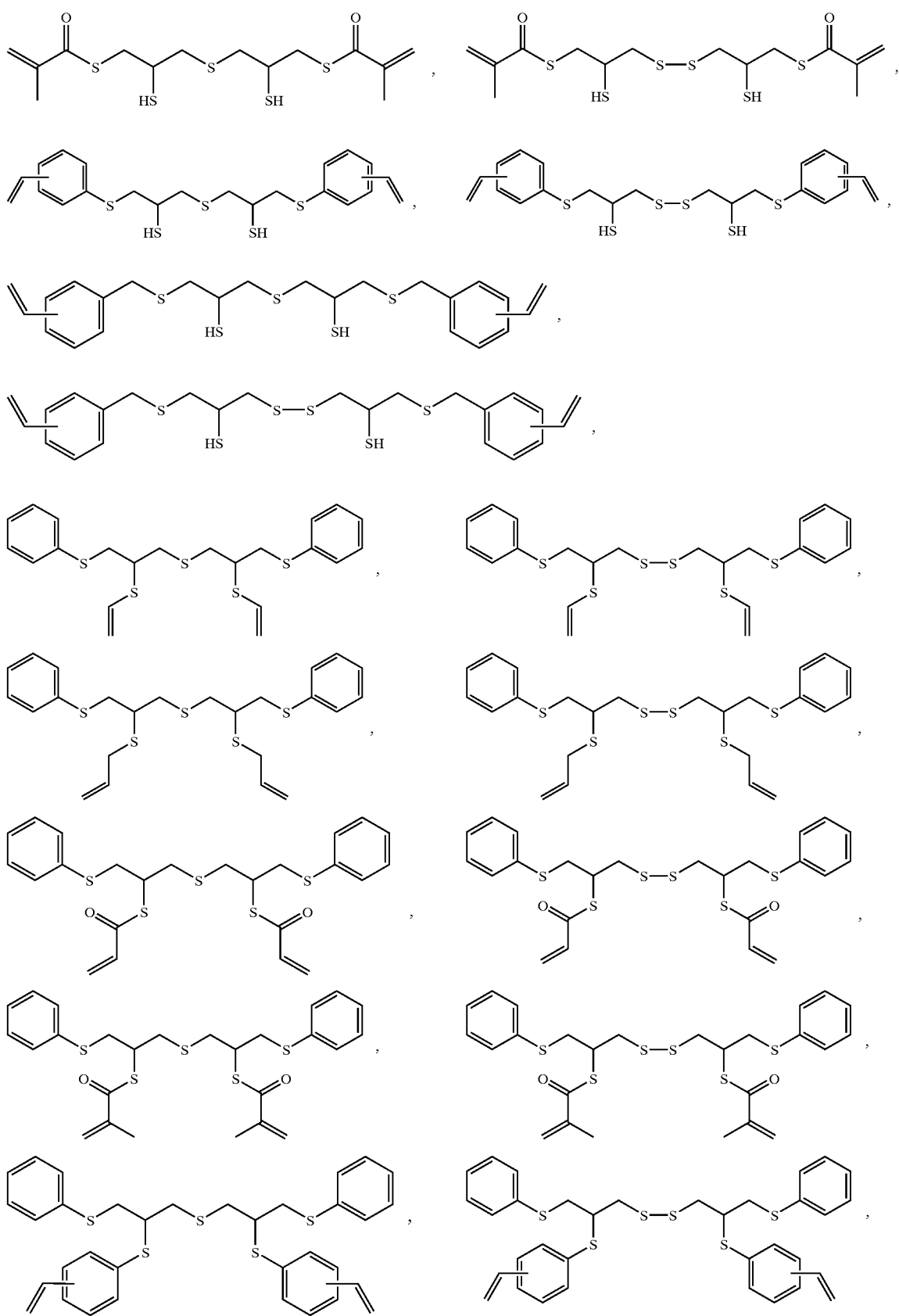

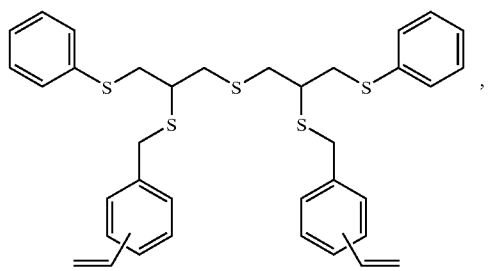
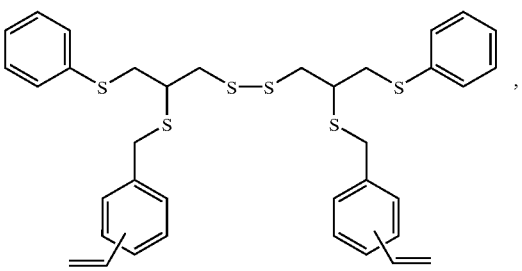

(Polymerizable Composition)

The polymerizable composition of the present invention 2 is a composition containing one or more sulfur-containing polyenic compounds represented by the above formula (15). The above polymerizable composition is new in that it contains the above compound(s) of the formula (15). It is characterized in that a cured product having a high refractive index and a high crosslinking density can be obtained.

The above polymerizable composition may be composed of the one or more sulfur-containing polyenic compounds of the formula (15) alone or may contain other copolymerizable compounds. The compounds copolymerizable with the compound of the formula (15) include (poly)enic compounds other than the compound of the formula (15) and (poly)thiol compounds.

Of the sulfur-containing compounds represented by the formula (15), compounds which are preferred in terms of a high refractive index and high crosslinking properties, are compounds represented by the formula (23).

(23)

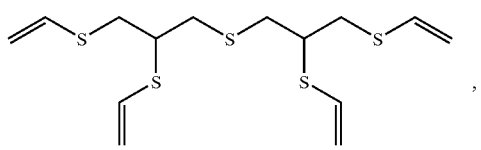
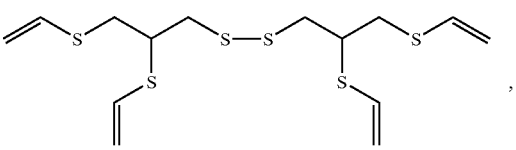

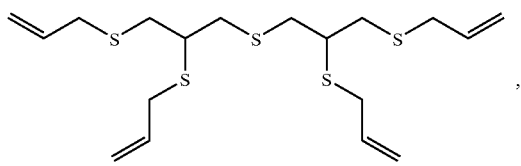
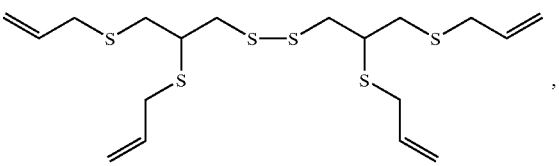

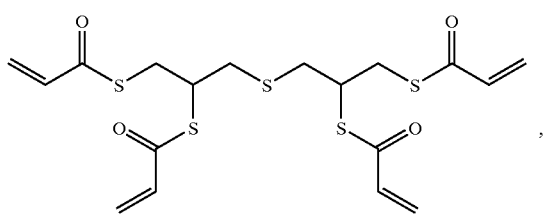
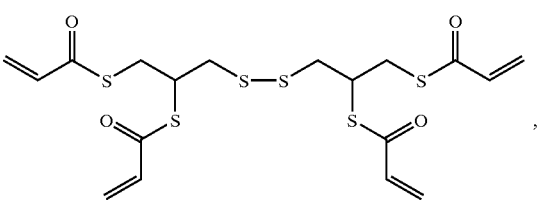

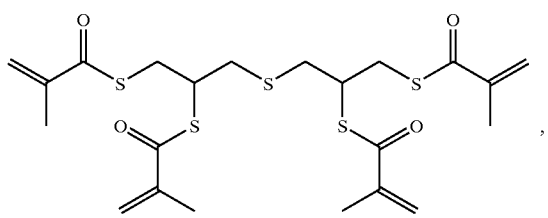
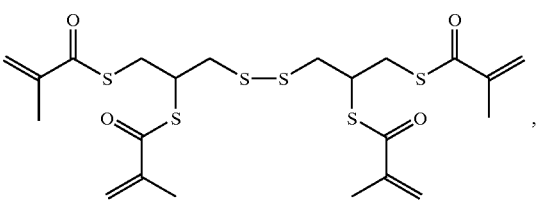

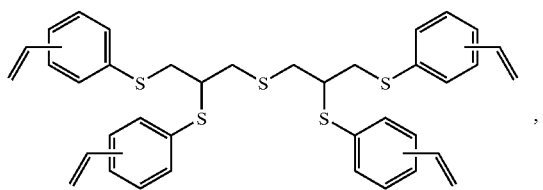
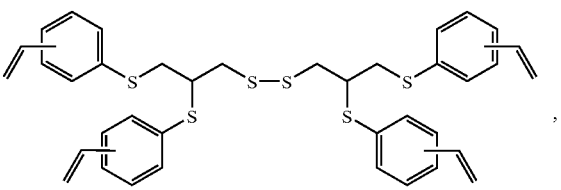

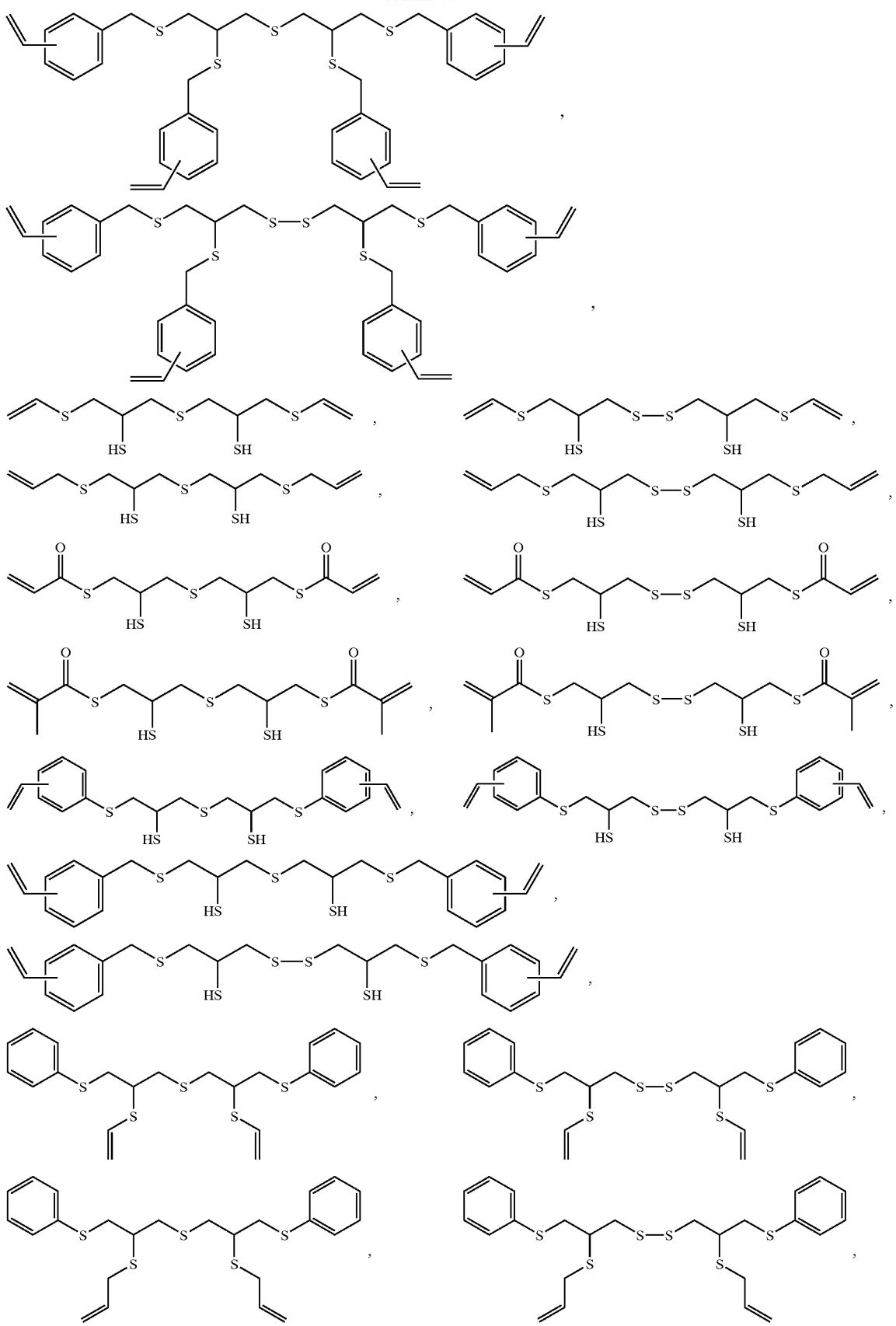

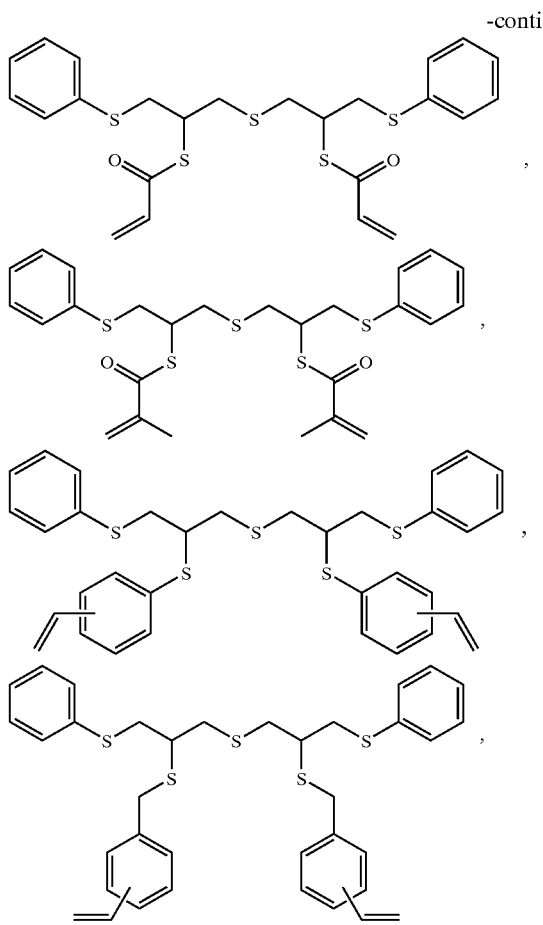

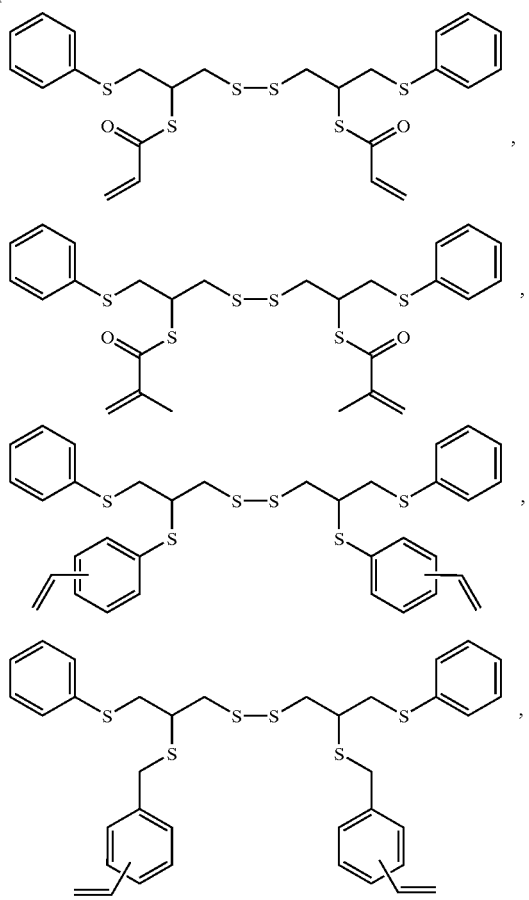

Further, the (poly)enic compounds other than the compounds of the formula (15) contained in the polymerizable composition include (1) vinyl compounds such as methyl vinyl ether, ethyl vinyl ether, isobutyl vinyl ether, 2-ethylhexylvinylether, phenyl vinyl ether, benzyl vinyl ether, 2-chloroethylvinylether, cyclohexyl vinyl ether, vinyl glycidyl ether, vinyl alcohol, methylvinyl carbinol, ethylene glycol monovinyl ether, ethylene glycol divinyl ether, diethylene glycol monovinyl ether, diethylene glycol divinyl ether, tetramethylene glycol monovinyl ether, divinyl sulfide, vinyl ethyl sulfide, vinyl phenyl sulfide, methyl vinyl ketone, divinyl dicarbonate, vinyl diglycol carbonate, vinylene carbonate, vinyl acetate, vinyl chloroacetate, vinyl propionate, vinyl butyrate, vinyl hexanoate, vinyl 2-ethylhexanoate, divinyl adipate, vinyl benzoate, vinyl salicylate, vinyl acrylate, vinyl methacrylate, vinyl bromide, vinyl iodide, vinyl phosphate, vinylurea, styrene, 2-methylstyrene, 3-methylstyrene, 4-methylstyrene, α-methylstyrene, 2,4,6-trimethylstyrene, 4-t-butylstyrene, stilbene, vinylphenol, 3-vinylbenzyl alcohol, 4-vinylbenzyl alcohol, 2-(4-vinylphenylthio)ethanol, 2-(3-vinylphenylthio)ethanol, 2-(4-vinylbenzylthio)ethanol, 2-(3-vinylbenzylthio)ethanol, 1,3-bis(4-vinylbenzylthio)-2-propanol, 1,3-bis(3-vinylbenzylthio)-2-propanol, 2,3-bis(4-vinylbenzylthio)-1-propanol, 2,3-bis(3-vinylbenzylthio)-1-propanol, cinnamyl alcohol, cinnamaldehyde, 1,3-divinylbenzene, 1,4-divinylbenzene, trivinylbenzene, divinylphthalate, 2-chlorostyrene, 3-chlorostyrene, 4-chlorostyrene, 3-chloromethylstyrene, 4-chloromethylstyrene, 4-aminostyrene, 3-cyanomethylstyrene, 4-cyanomethylstyrene, 4-vinylbiphenyl, 2,2'-divinylbiphenyl, 4,4'-divinylbiphenyl, 2,2'-distyryl ether, 4,4'-distyryl ether, 2,2'-distyrylsulphide, 4,4'-distyrylsulphide, 2,2-bis(4-vinylphenyl)propane, bis(4-vinylphenyl)ether and 2,2-bis(4-vinyloxyphenyl) propane, (2) allyl compounds obtained by substituting part or all of vinyl groups of the above vinyl compounds with allyl groups, (3) acrylic compounds such as methylacrylate, ethylacrylate, propylacrylate, butylacrylate, cyclohexylacrylate, 2-hydroxyethyl acrylate, 3-hydroxypropyl acrylate, 2-hydroxypropyl acrylate, 3-phenoxy-2-hydroxypropylacrylate, trimethylol propane monoacrylate, 2-hydroxyethyl isocyanurate monoacrylate, 2-hydroxyethyl isocyanurate diacrylate, 2-hydroxyethyl cyanurate monoacrylate, 2-hydroxyethyl cyanurate diacrylate, ethylene glycol diacrylate, diethylene glycol diacrylate, 1,3-butylene glycol diacrylate, triethylene glycol diacrylate, polyethylene glycol diacrylate, propylene glycol diacrylate, 1,3-propanediol diacrylate, 1,3-butanediol diacrylate, 1,4-butanediol diacrylate, 1,6-hexanediol diacrylate, neopentyl glycol diacrylate, polypropylene glycol diacrylate, 2-hydroxy-1,3-diacryloxypropane, 2,2-bis

[4-(acryloxyethoxy)phenyl]propane, 2,2-bis[4-(acryloxyethoxy)cyclohexyl]propane, 2,2-bis[4-(2-hydroxy-3-acryloxypropoxy)phenyl]propane, 2,2-bis[4-(acryloxy·diethoxy)phenyl]propane, 2,2-bis[4-(acryloxy·polyethoxy)phenyl]propane, trimethylol propane triacrylate, pentaerythritol monoacrylate, pentaerythritol diacrylate, pentaerythritol triacrylate, pentaerythritol tetraacrylate, pentaacrylate of bis(2,2,2-trimethylolethyl)ether, hexaacrylate of bis(2,2,2-trimethylolethyl)ether, and bis(4-acryloylthiophenyl) sulfide, and (4) methacrylic compounds obtained by substituting part or all of acrylic groups of the above acrylic compounds with methacrylic groups.

The above (poly)enic compounds which are not included in the compound of the formula (15) can be used as required, when at least one sulfur-containing polyenic compound of the formula (15) is contained in the polymerizable composition. These (poly)enic compounds maybe used alone or in combination.

The (poly)thiol compound contained in the polymerizable composition includes polytiol compounds represented by the formula (24),

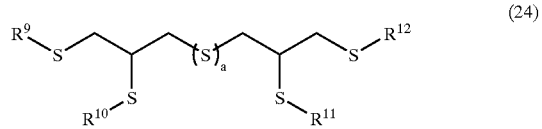

(24)

(wherein a is an integer of 1 or 2, and R9 to R12 are a hydrogen atom or an organic residue having 0 to 20 carbon atoms, provided that at least two of R9 to R12 are a hydrogen atom or an organic residue having a mercapto group) and (poly)thiol compounds other than the compound of the formula (24).

Of the polythiol compounds represented by the formula (24), compounds represented by the following formula (25) are preferred since these compounds have a high refractive index and is copolymerizable with the enic compound in a high crosslinking density.

(25)

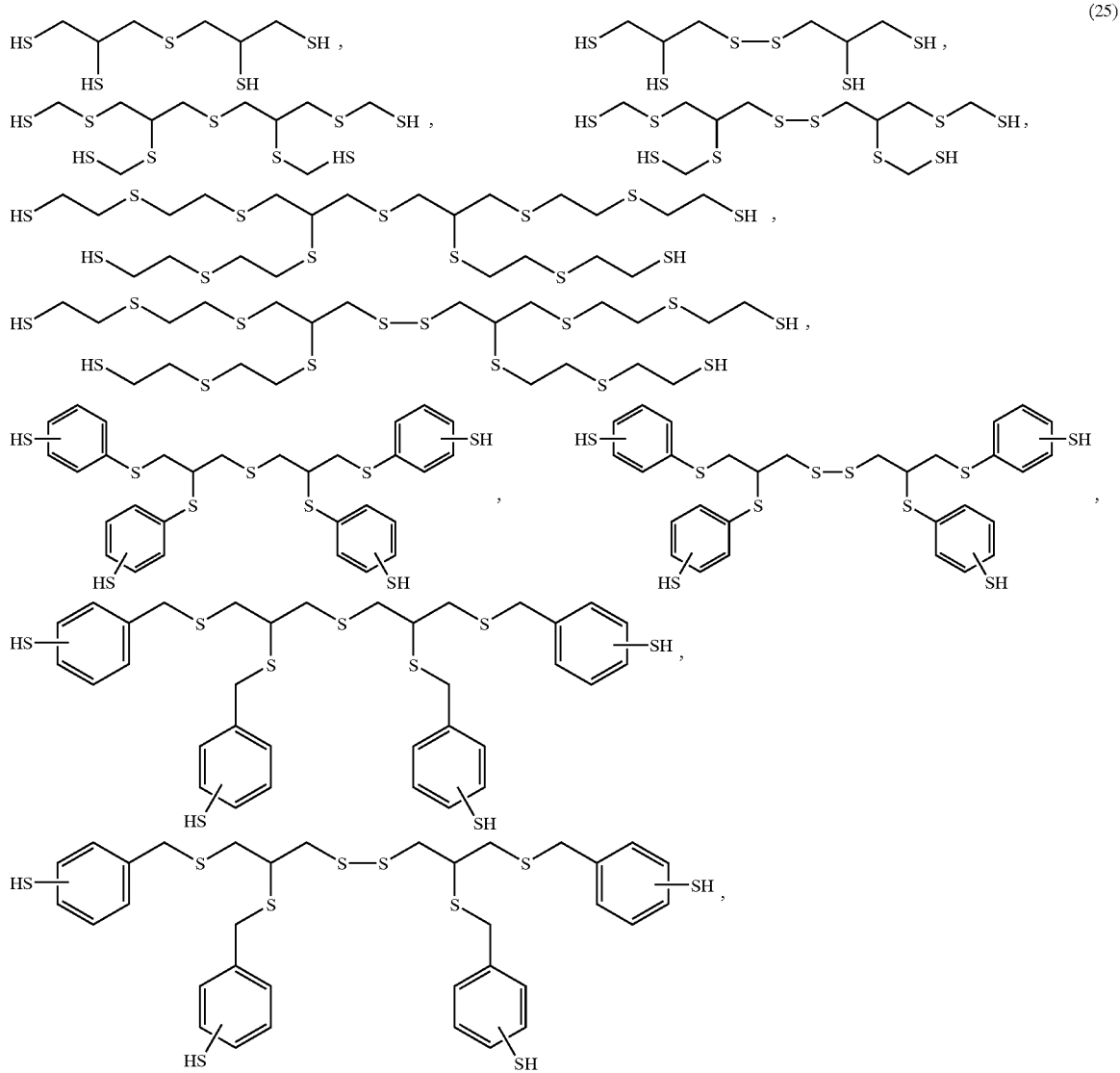

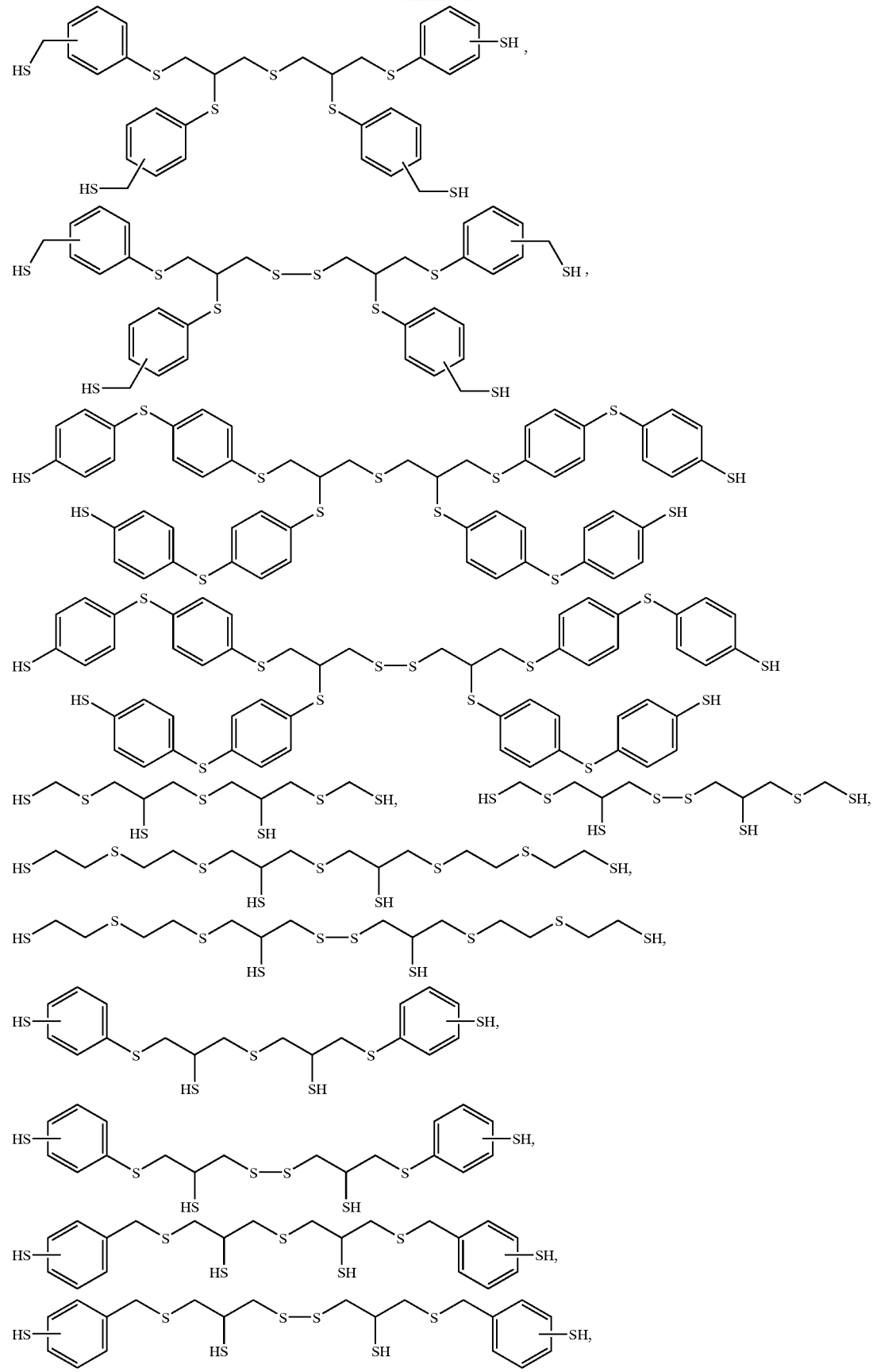

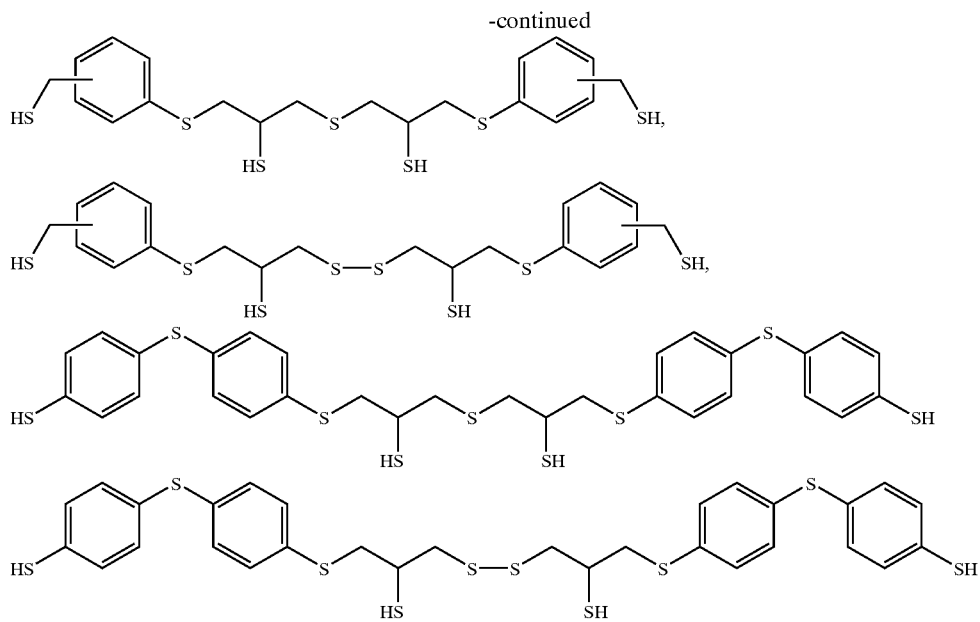

The (poly)enic compounds other than the compound of the formula (24) includes aliphatic mercaptans such as methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, i-propyl mercaptan, t-butyl mercaptan, t-nonyl mercaptan, t-dodecyl mercaptan, phenyl mercaptan, benzyl mercaptan, 3-methylphenyl mercaptan, 4-methylphenyl mercaptan, 4-chlorobenzyl mercaptan, 4-vinylbenzyl mercaptan, 3-vinylbenzyl mercaptan, methyl mercaptopropionate, 2-mercaptoethanol, 3-mercapto-1,2-propanediol, 2-mercapto-1,3-propanediol, mercaptoacetic acid, mercaptoglycolic acid, mercaptopropionic acid, methane dithiol, 1,2-dimercaptoethane, 1,2-dimercaptopropane, 1,3-dimercaptopropane, 2,2-dimercaptopropane, 1,4-dimercaptobutane, 1,6-dimercaptohexane, bis(2-mercaptoethyl)ether, bis(2-mercaptoethyl)sulfide, 1,2-bis(2-mercaptoethyloxy)ethane, 1,2-bis(2-mercaptoethylthio)ethane, 2,3-dimercapto-1-propanol, 1,3-dimercapto-2-propanol, 1,2,3-trimercaptopropane, 2-mercaptomethyl-1,3-dimercaptopropane, 2-mercaptomethyl-1,4-dimercaptobutane, 2-(2-mercaptoethylthio)-1,3-dimercaptopropane, 4-mercaptomethyl-1,8-dimercapto-3,6-dithiaoctane, 2,4-dimercaptomethyl-1,5-dimercapto-3-thiapentane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1-tris(mercaptomethyl)propane, tetrakiss(mercaptomethyl)methane, ethylene glycol bis(2-mercaptoacetate), ethylene glycol bis(3-mercaptopropionate), diethylene glycol bis(2-mercaptoacetate), diethylene glycol bis(3-mercaptopropionate), 1,4-butanediol bis(2-mercaptoacetate), 1,4-butanediol bis(3-mercaptopropionate), trimethylolpropanetris(2-mercaptoacetate), trimethylolpropanetris(3-mercaptopropionate), pentaerithritol tetrakiss(2-mercaptoacetate), pentaerithritol tetrakiss(3-mercaptopropionate), 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-bis(mercaptomethyl)-1,4-dithiane, 2,5-bis(2-mercaptoethyl)-1,4-dithiane, 2,5-bis(2-mercaptoethylthiomethyl)-1,4-dithiane, 2,5-bis(mercaptomethyl)-1-thiane, 2,5-bis(2-mercaptoethyl)-1-thiane and 2,5-bis(mercaptomethyl)thiophene, and aromatic cyclic mercaptans such as 1,2-dimercaptobenzene, 1,3-dimercaptobenzene, 1,4-dimercaptobenzene, 1,3-bis(mercaptomethyl)benzene, 1,4-bis(mercaptomethyl)benzene, 2,2'-dimercaptobiphenyl, 4,4'-dimercaptobiphenyl, bis(4-mercaptophenyl)methane, 2,2-bis(4-mercaptophenyl)propane, bis(4-mercaptophenyl)ether, bis(4-mercaptophenyl)sulfide, bis(4-mercaptophenyl)sulfone, bis(4-mercaptomethylphenyl)methane, 2,2-bis(4-mercaptomethylphenyl)propane, bis(4-mercaptomethylphenyl)ether, bis(4-mercaptomethylphenyl)sulfide, 4-hydroxythiophenol and mercaptobenzoic acid.

(Curing Method)

The cured product of the present invention 2 can be obtained by polymerizing the polymerizable composition of the present invention 2. The curing method therefor is not specially limited. It includes polymerization by heating and polymerization by irradiation with visible light, ultraviolet light or an active energy line such as an electron beam. These curing methods can be used in combination. In this case, a thermal polymerization initiator or a photopolymerization initiator may be used. Photopolymerization is preferred for a use in which a short-time polymerization or a low-temperature polymerization is required.

The polymerization initiator to be used when thermal polymerization is carried out includes a thermal radical polymerization initiator, a thermal cation polymerization initiator and a thermal anion polymerization initiator. The thermal radical polymerization initiator includes peroxide-type initiators such as di-t-butylperoxide, dicumylperoxide, t-butylhydroperoxide, cumene hydroperoxide, t-butylperoxyneodecanate, benzoyl peroxide, lauroyl peroxide, persulfate, diisopropylperoxydicarbonate and dicyclohexylperoxydicarbonate, azo-type initiators such as azobisisobutyronitrile, methyl azobisbutyrate, azobisdimethylvaleronitrile, azobiscyclohexanecarbonitrile, t-butyl hyponitrite and azobisisobutylamidine hydrochloride, and redox-type initiators such as hydrogen peroxide-ferric(II)salt, persulfate-sodium hydrogensulfite, cumene hydroperoxide-ferric(II)salt and benzoyl peroxide-dimethylaniline.

The thermal cation polymerization initiator includes Lewis acids such as a boron trifluoride•diethyl ether complex, a boron trifluoride•amine complex, aluminum chloride, titanium tetrachloride, tin tetrachloride, iron chloride (III) and zinc chloride, ammonium salt, sulfonium salt, oxonium salt and phosphonium salt.

The thermal anion polymerization initiator includes amines such as trimethylamine or triethylamine. These initiators may be used alone or in combination.

The polymerization initiator to be used when photopolymerization is carried out includes a photoradical polymerization initiator, a photo cation polymerization initiator and a photo anion polymerization initiator. The photoradical polymerization initiator includes acetophenone, trichloroacetophenone, 2-hydroxy-2-methyl-propiophenone, 1-hydroxycyclohexyl phenyl ketone, benzoin methyl ether, benzoin ethyl ether, benzoin isobutyl ether, benzoin isopropyl ether, 2,2-diethoxyacetophenone, 2,2-dimethoxy-2-phenylacetophenone, 1-[4-(2-hydroxyethoxy)phenyl]-2-hydroxy-2-methyl-1-propane-1-one, 2-benzyl-2-dimethylamino-1-(4-morpholinophenyl) butanone-1,2-methyl-1[4-(methylthio)phenyl]-2-morpholinopropane-1-one, benzyl, methyl benzoyl formate, 1-phenyl-1,2-propanedione-2-(o-benzoyl)oxime, 2,4,6-trimethylbenzoyldiphenylphosphine oxide, 2,4,6-trimethylbenzoylphenylethoxyphosphine oxide, bis(2,4,6-trimethylbenzoyl)-phenylphosphine oxide, benzophenone, methyl o-benzoyl benzoate, [4-(methylphenylthio)phenyl] phenylmethane, 4,4'-bisdiethylaminobenzophenone, 1,4-dibenzoylbenzene, 2-benzoylnaphthalene, 4-benzoyldiphenyl, 4-benzoyldiphenyl ether, xanthone, thioxanthone, isopropyl thioxanthone, 2,4-dimethylthioxanthone, 2-chlorothioxanthone, ethylanthraquinone and 10-butyl-2-chloroacridone.

The photo cation polymerization initiator includes aromatic diazonium salt, aromatic sulfonium salt, aromatic iodonium salt, aromatic phosphonium salt, aromatic oxysulfoxonium salt and metallocene type compounds.

The photo anion polymerization initiator includes tributyl naphthoylmethyl ammonium iodide, tributyl naphthoylmethyl ammonium hexafluorophosphate, tributyl naphthoyl-methyl ammonium triflate, tributyl naphthoylmethyl ammonium hexafluoroantimonate, trimethyl naphthoylmethyl ammonium butyl triphenylborate, tributyl benzoylmethyl ammonium butyl triphenylborate and tributyl naphthoylmethyl ammonium butyl triphenylborate. These initiators may be used alone or in combination.

Of the above polymerization initiators, preferred are the thermal radical polymerization initiator and the photoradical polymerization initiator.

The polymerizable composition of the present invention 2 may contain a sensitizer, an ultraviolet absorber, an antioxidant, a yellowing inhibitor, a blueing agent, a pigment, a releasing agent, an adherence agent, a surface conditioner, a leveling agent, a deodorizer, and the like, as required, in such a range that the effects of the present invention are not impaired. Before polymerizing the polymerizable composition of the present invention, treatment such as degassing treatment or filtration treatment may be carried out as required.

There may be adopted a method in which part or all of the compounds contained in the polymerizable composition of the present invention 2 are preliminarily allowed to react, to obtain a prepolymer and the prepolymer is used to prepare a polymerizable composition. The method of the preliminary reaction is not specially limited. It may be a polymerization reaction by heating or a polymerization reaction by photo irradiation. In this case, there may be used a polymerization initiator as required.

A method of molding the cured product obtained by polymerizing the polymerizable composition of the present invention 2 is not specially limited. It is allowable to inject the curable composition into a mold made of glass or metal, to apply it to a substrate such as glass or plastic or to interpose it between two substrates.

A light source to be used for carrying out photo-curing depends on the kind of the photopolymerization initiator, while it includes an ozone lamp, a fluorescent lamp, a sunshiny lamp, an electric bulb, sunlight, a microwave electrodeless lamp, a microwave electrode lamp, a low-pressure mercury lamp, a high pressure mercury lamp, a halogen lamp, a metal halide lamp, a helium lamp, a neon lamp, an argon lamp, a sodium lamp, carbon arc, a infrared ray bulb, an EB irradiation device and a magnetic line irradiation device. Further, the photopolymerization can be carried out with heating or cooling.

The present invention 3 provides a sulfur-containing polythiol compound represented by the following formula (40), a cured product thereof and an optical material from the cured product,

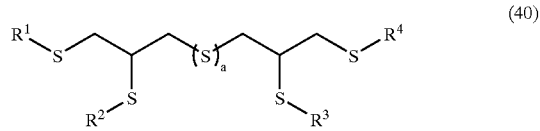

(40)

wherein a is an integer of 1 or 2, $R^1$ to $R^4$ are a hydrogen atom, an aliphatic group, an aromatic group, an alicyclic group or a heterocyclic ring and may have a structure having a thiol group, provided that at least two of $R^1$ to $R^4$ are a hydrogen atom or an aliphatic group having a thiol group, an aromatic group having a thiol group, an alicyclic group having a thiol group or a heterocyclic ring having a thiol group and that all of $R^1$ to $R^4$ are not a hydrogen atom simultaneously. The sulfur-containing polythiol compound contains five or more sulfur atoms in one molecule and thus has a high refractive index. Further, since the molecular weight thereof per thiol group is adequately large, a large amount of a thiol compound can be incorporated in a polymerizable composition. Therefore, the above sulfur-containing polythiol compound is useful as a raw material for a high-refractive index plastic material.

(Synthesizing Method)

A method for synthesizing the sulfur-containing polythiol compound of the formula (40) is not specially limited. It can be synthesized by a thio-esterification reaction between a thiol compound and a halide or a ring-opening addition reaction between an episulfide compound and a thiol compound. Concrete synthesizing methods will be explained hereinafter.

Synthesizing method (1): the sulfur-containing polythiol compound of the formula (40) can be synthesized by reacting a tetrathiol compound represented by the formula (17) of the present invention 2 with a halide represented by the formula (43), $$X—R^5 \qquad (43)$$

wherein X is an halogen atom and $R^5$ is an aliphatic group, an aromatic group, an alicyclic group or a heterocyclic ring and may have a structure having a thiol group, in the presence of a base. Particularly, a compound of the formula (40) in which $R^1$ to $R^4$ are the same can be efficiently synthesized.

The above halide of the formula (43) is preferably a compound having a high content of sulfur atoms or aromatic rings for the purpose of increasing the refractive index. Concrete examples thereof includes chlorides such as chloromercaptomethane, chloroethyl mercaptoethyl sulfide, chloroethyl mercaptoethyl ether, chlorobenzene, 2-chlorothiophenol, 3-chlorothiophenol, 4-chlorothiophenol, 2-chloromethylthiophenol, 3-chloromethylthiophenol, 4-chloromethylthiophenol, 2-chlorobenzylmercaptane, 3-chlorobenzylmercaptane, 4-chlorobenzylmercaptane, 2-chloromethylbenzylmercaptane, 3-chloromethylbenzylmercaptane, 4-chloromethylbenzylmercaptane and 4-chlorophenyl-4'-mercaptophenylsulfide, and bromides obtained by substituting chlorine of the above chlorides with bromine. Further, these halides can be used alone or in combination.

The amount of the halide is preferably 0.5 to 5.0 equivalents, more preferably 1.0 to 3.0 equivalents, based on 1 equivalent of a thiol group, to which the halide is to be added, of the tetrathiol compound of the formula (17). When it is smaller than 0.5, addition of the halide becomes insufficient so that it is undesirable in terms of efficiency. When it exceeds 5.0, an unreacted halide remains in a large amount so that it is undesirable in terms of cost.

The base used for the above reaction includes alkali metal salts such as sodium hydroxide, potassium hydroxide, sodium methoxide and sodium ethoxide, and tertiary amines such as trimethylamine, triethylamine and pyridine. The amount of the base is preferably 0.1 to 5.0 equivalents, more preferably 1.0 to 3.0 equivalents, based on 1 equivalent of a thiol group to which the halide is to be added. When it is smaller than 0.1, the reaction advances slowly so that it is undesirable in terms of productivity. When it is larger than 5.0, a side reaction is apt to occur so that it is undesirable in terms of efficiency.

A solvent is not specially limited so long as it can dissolve reaction raw materials and has no reactivity with the reaction raw materials. When an alkali metal salt such as sodium hydroxide is used as a catalyst, the reaction may be carried out in an aqueous solution. When tertiary amines are used as a catalyst, it is preferred to use an organic solvent. The organic solvent includes aliphatic hydrocarbons such as hexane and heptane, aromatic hydrocarbons such as benzene and toluene, ethers such as tetrahydrofuran and diethyl ether, and halogenated hydrocarbons such as dichloromethane and chloroform. These solvents may be used in combination.

The reaction temperature is preferably −30 to 50° C., more preferably −10 to 30° C. When it is smaller than −30° C., the reaction rate becomes slow, so that it is undesirable in terms of productivity. When it is higher than 50° C., a side reaction is apt to occur so that it is undesirable in terms of efficiency.

Synthesizing method (2): A compound of the formula (40) in which R2 and R3 are a hydrogen atom can be synthesized by reacting a diepisulfide compound represented by the formula (19) of the present invention 2 with a thiol compound represented by the formula (44), $$HS-R^6 \qquad (44)$$

wherein $R^6$ is an aliphatic group, an aromatic group, an alicyclic group or a heterocyclic ring and may have a structure having a thiol group.

Particularly, a compound of the formula (40) in which $R^1$ and $R^4$ are the same can be efficiently synthesized.

The thiol compound of the formula (44) is preferably a compound having a high content of sulfur atoms or aromatic rings for the purpose of increasing the refractive index. Concrete examples thereof include dimercaptomethane, 2,2'-thiodiethanethiol, 2,2'-oxydiethanethiol, thiophenol, 1,2-benzenedithiol, 1,2-benzenedithiol, 1,3-benzenedithiol, 1,4-benzenedithiol, 2-mercaptomethylthiophenol, 3-mercaptomethylthiophenol, 4-mercaptomethylthiophenol, 1,2-bis(mercaptomethyl)benzene, 1,3-bis(mercaptomethyl) benzene, 1,4-bis(mercaptomethyl)benzene and 4,4'-thiodibenzenethiol. These thiol compounds may be used alone or in combination.

The amount of the thiol compound is preferably 0.5 to 5.0 equivalents, more preferably 1.0 to 3.0 equivalents, based on 1 equivalent of an episulfide ring of the diepisulfide compound of the formula (44). When it is smaller than 0.5, a ring-opening reaction becomes insufficient so that it is undesirable in terms of efficiency. When it exceeds 5.0, an unreacted thiol compound remains in a large amount so that it is undesirable in terms of cost.

Further, a catalyst may be added to this reaction as required. The catalyst includes amines, alkali metal salts, phosphines, quaternary ammonium salts, quaternary phosphonium salts and Lewis acids. The amount of the catalyst is preferably 0.0001 to 10.0 equivalents, more preferably 0.001 to 5.0 equivalents, based on 1 equivalent of an episulfide ring. When it is smaller than 0.0001, the reaction advances slowly so that it is undesirable in terms of productivity. When it is larger than 10.0, a side reaction is apt to occur so that it is undesirable in terms of efficiency.

A solvent is not specially limited so long as it can dissolve reaction raw materials and has no reactivity with the reaction raw materials. The solvent includes aliphatic hydrocarbons such as hexane and heptane, aromatic hydrocarbons such as benzene and toluene, ethers such as tetrahydrofuran and diethyl ether, and halogenated hydrocarbons such as dichloromethane and chloroform. When a metal oxide such as sodium hydroxide is used as the catalyst, the reaction may be carried out in an aqueous solution. These solvents may be used in combination.

The reaction temperature is preferably −30 to 50° C., more preferably −10 to 30° C. When it is smaller than −30° C., the reaction rate becomes slow, so that it is undesirable in terms of productivity. When it is higher than 50° C., a side reaction is apt to occur so that it is undesirable in terms of efficiency.

(Concrete Examples)

Concrete examples of the sulfur-containing polythiol compound of the formula (40) will be shown hereinafter, while it shall not be limited thereto. Among compounds represented by the formula (40), compounds which can be efficiently synthesized are a compound of the formula (40) in which $R^1$ to $R^4$ are the same and a compound of the formula (40) in which $R^2$ and $R^3$ are a hydrogen atom and $R^1$ and $R^4$ are the same. Further, a compound having a high refractive index is a compound having a high content of sulfur atoms or aromatic rings.

Therefore, as a compound which can be efficiently synthesized and has a high refractive index, there are enumerated compounds represented by the following formula (45).

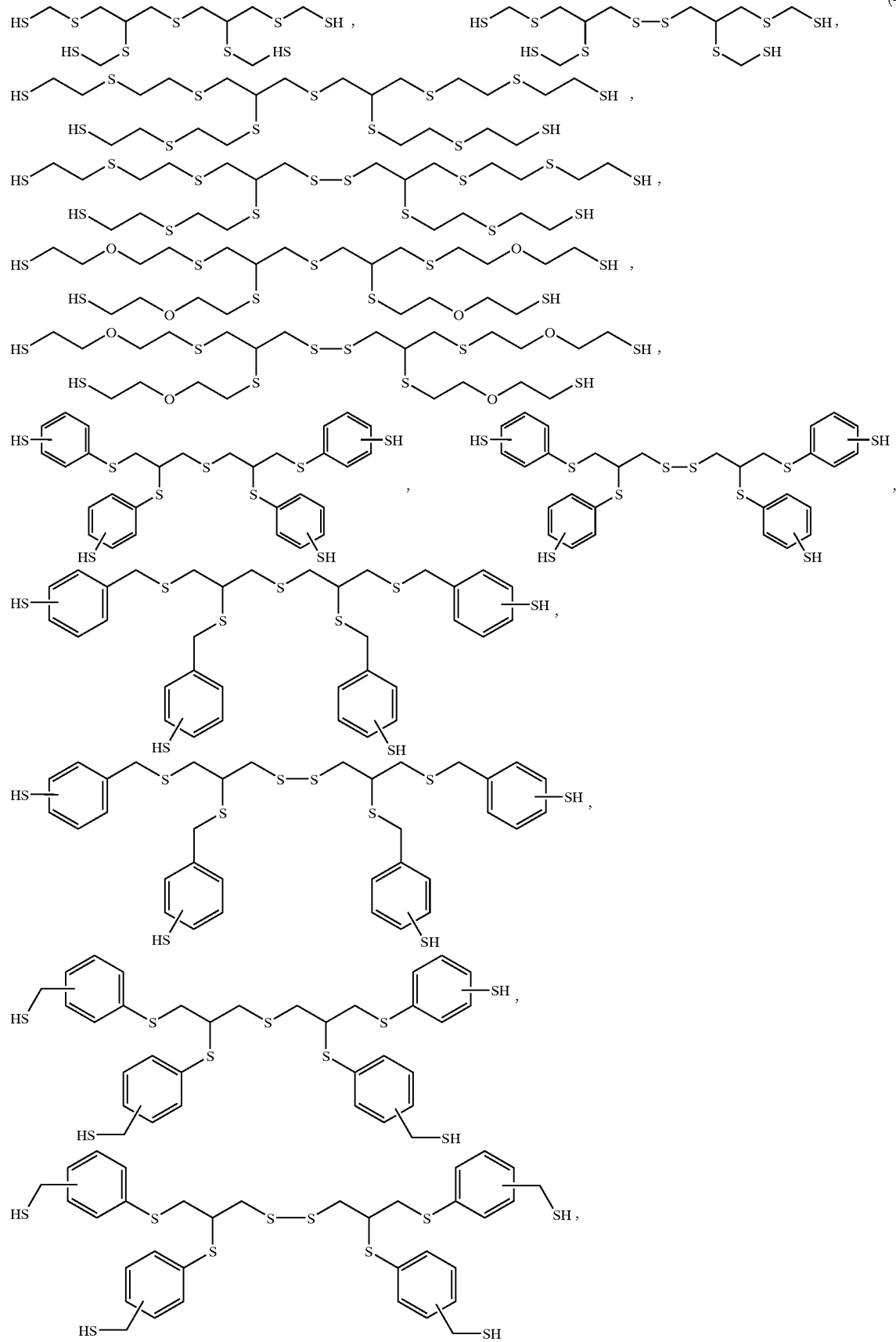

-continued
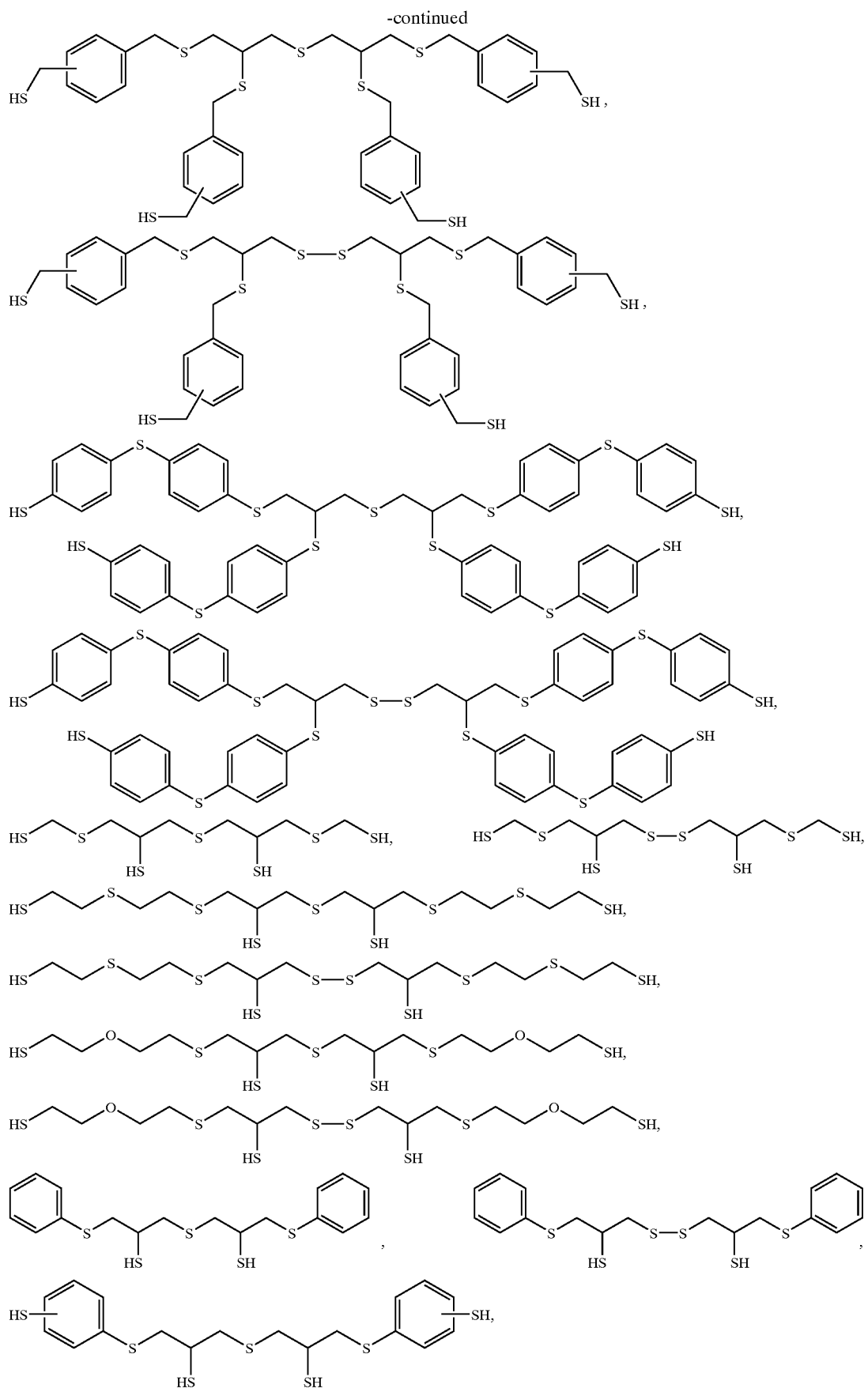

-continued

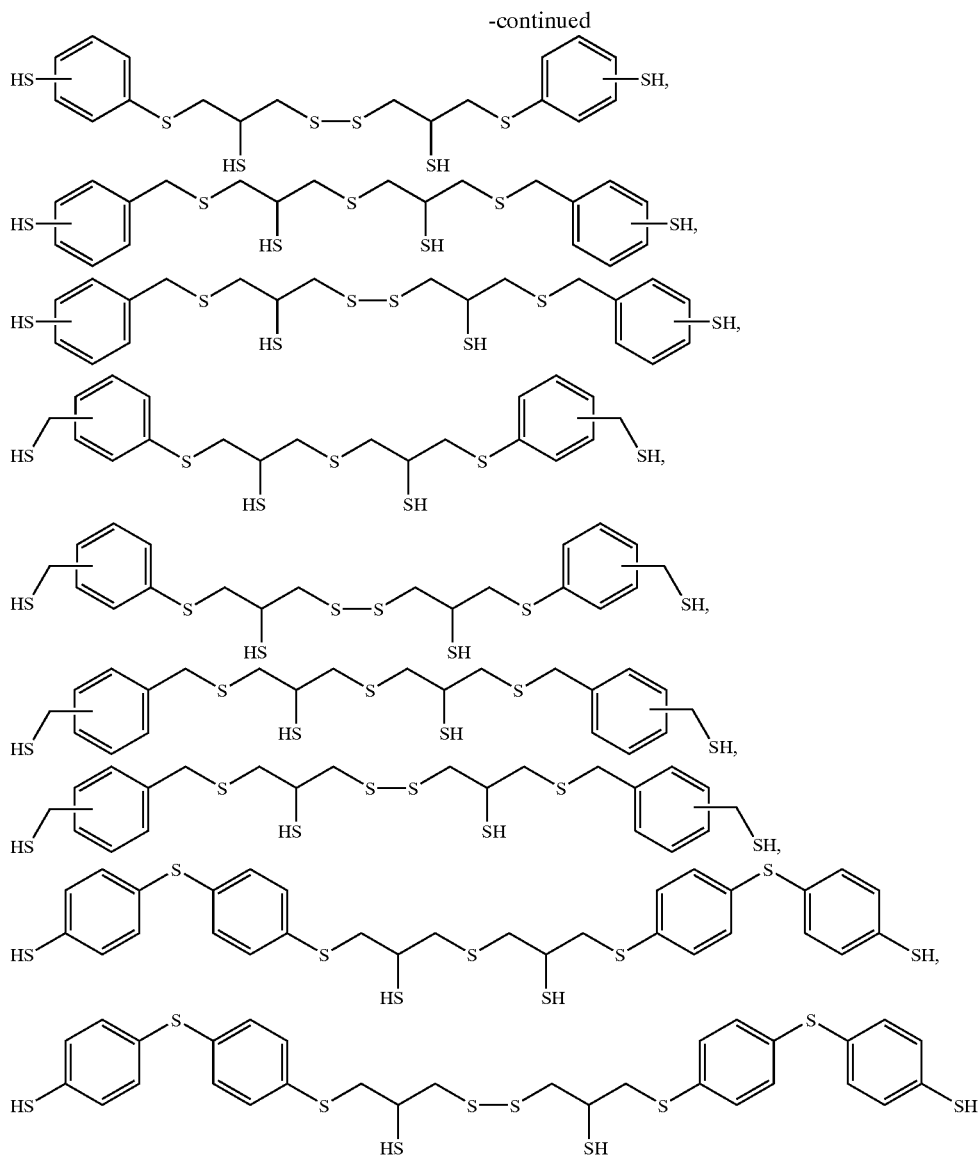

(Explanations of Polymerizable Composition)

The polymerizable composition of the present invention 3 is a composition containing the above sulfur-containing polythiol compound represented by the formula (40), a thiol compound other than the compound of the formula (40) and a compound copolymerizable with a thiol compound. The above polymerizable composition is new in that it contains one or more kinds of the sulfur-containing polythiol compounds of the formula (40). It is characterized in that a cured product having a high refractive index and a high crosslinking density can be obtained.

As a concrete example of the sulfur-containing polythiol compound of the formula (40) contained in the polymerizable composition of the present invention, there are enumerated compounds represented by the above formula (45).

Further, concrete examples of the thiol compound other than the sulfur-containing polythiol compound of the formula (40) include aliphatic mercaptans such as methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, i-propyl mercaptan, t-butyl mercaptan, t-nonyl mercaptan, t-dodecyl mercaptan, phenyl mercaptan, benzyl mercaptan, 3-methylphenyl mercaptan, 4-methylphenyl mercaptan, 4-chlorobenzyl mercaptan, 4-vinylbenzyl mercaptan, 3-vinylbenzyl mercaptan, methyl mercaptopropionate, 2-mercaptoethanol, 3-mercapto-1,2-propanediol, 2-mercapto-1,3-propanediol, mercaptoacetic acid, mercaptoglycolic acid, mercaptopropionic acid, methane dithiol, 1,2-dimercaptoethane, 1,2-dimercaptopropane, 1,3-dimercaptopropane, 2,2-dimercaptopropane, 1,4-dimercaptobutane, 1,6-dimercaptohexane, bis(2-mercaptoethyl)ether, bis(2-mercaptoethyl)sulfide, 1,2-bis(2-mercaptoethyloxy)ethane, 1,2-bis(2-mercaptoethylthio)ethane, 2,3-dimercapto-1-propanol, 1,3-dimercapto-2-propanol, 1,2,3-trimercaptopropane, 2-mercaptomethyl-1,3-dimercaptopropane, 2-mercaptomethyl-1,4-dimercaptobutane, 2-(2-mercaptoethylthio)-1,3-dimercaptopropane, 4-mercaptomethyl-1,8-dimercapto-3,6-dithiaoctane, 1,2,6,7-tetramercapto-4-thiaheptane, 1,2,7,8-tetramercapto-4,5-thiaoctane, 1,2,8,9-tetramercapto-4,6-dithianonane, 1,2,10,11-tetramercapto-4,6,8- trithioundecane, 2,4-dimercaptomethyl-1,5-dimercapto-3-thiapentane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1-tris(mercaptomethyl)propane, tetrakiss(mercaptomethyl)methane, ethylene glycol bis(2-mercaptoacetate), ethylene glycol bis(3-mercaptopropionate), diethylene glycol bis(2-mercaptoacetate), diethylene glycol bis(3-mercaptopropionate), 1,4-butanediol bis(2-mercaptoacetate), 1,4-butanediol bis(3-mercaptopropionate), trimethylolpropanetris(2-mercaptoacetate), trimethylolpropanetris(3-mercaptopropionate), pentaerithritol tetrakiss(2-mercaptoacetate), pentaerithritol tetrakiss(3-mercaptopropionate), 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-bis(mercaptomethyl)-1,4-dithiane, 2,5-bis(2-mercaptoethyl)-1,4-dithiane, 2,5-bis(2-mercaptoethylthiomethyl)-1,4-dithiane, 2,5-bis(mercaptomethyl)-1-thiane, 2,5-bis(2-mercaptoethyl)-1-thiane and 2,5-bis(mercaptomethyl)thiophene, and aromatic cyclic mercaptans such as 1,2-dimercaptobenzene, 1,3-dimercaptobenzene, 1,4-dimercaptobenzene, 1,3-bis(mercaptomethyl)benzene, 1,4-bis(mercaptomethyl)benzene, 2,2'-dimercaptobiphenyl, 4,4'-dimercaptobiphenyl, bis(4-mercaptophenyl)methane, 2,2-bis(4-mercaptophenyl)propane, bis(4-mercaptophenyl)ether, bis(4-mercaptophenyl)sulfide, bis(4-mercaptophenyl)sulfone, bis(4-mercaptomethylphenyl)methane, 2,2-bis(4-mercaptomethylphenyl)propane, bis(4-mercaptomethylphenyl)ether, bis(4-mercaptomethylphenyl)sulfide, 4-hydroxythiophenol and mercaptobenzonic acid.

The examples of the thiol compound are shown above. Two or more thiol compounds may be used in combination so long as the polymerizable composition contains at least one kind of the sulfur-containing polythiol compound of the formula (40).

The compound copolymerizable with a thiol compound includes an enic compound, an isocyanate compound, an isothiocyanate compound, an epoxy compound and an episulfide compound.

The enic compound includes the polyenic compound represented by the formula (15) of the present invention 2, and a vinyl compound, an allyl compound, an acrylic compound and a methacrylic compound other than the formula (15).

Concrete examples of the polyenic compound of the formula (15) include the compounds shown in the formula (21) of the present invention 2.

Examples of an enic compound other than the polyenic compound of the formula (15) of the present invention 2 include the compounds of (1), (2), (3) and (4) shown in the present invention 2.

of these enic compounds other than the formula (15), compounds which are preferred in terms of high crosslinking properties are bifunctional or higher functional enic compounds. Further, compounds which are preferred in terms of a high refractive index are compounds having high contents of sulfur atoms and/or aromatic rings and/or halogen atoms other than chlorine. Therefore, compounds which are preferred in terms of high crosslinking properties and a high refractive index include (1) vinyl compounds such as divinyl sulfide, vinyl ethyl sulfide, 1,3-bis(4-vinylbenzylthio)-2-propanol, 1,3-bis(3-vinylbenzylthio)-2-propanol, 2,3-bis(4-vinylbenzylthio)-1-propanol, 2,3-bis(3-vinylbenzylthio)-1-propanol, 1,3-divinylbenzene, 1,4-divinylbenzene, trivinylbenzene, 2,2'-divinylbiphenyl, 4,4'-divinylbiphenyl, 2,2'-distyrylether, 4,4'-distyrylether, 2,2'-distyrylsulfide, 4,4'-distyrylsulfide, 2,2-bis(4-vinylphenyl)propane, bis(4-vinylphenyl)ether and 2,2-bis(4-vinyloxyphenyl)propane, (2) allyl compounds obtained by substituting part or all of vinyl groups of the vinyl compounds of the above (1) with allyl groups, (3) acrylic compounds such as 2,2-bis[4-(acryloxyethoxy)phenyl]propane, 2,2-bis[4-(2-hydroxy-3-acryloxypropoxy)phenyl]propane, 2,2-bis[4-(acryloxy•diethoxy)phenyl]propane, 2,2-bis[4-(acryloxy•polyethoxy)phenyl]propane and bis(4-acryloylthiophenyl)sulfide, and (4) methacrylic compounds obtained by substituting part or all of acrylic groups of the acrylic compounds of the above (3) with methacrylic groups.

Of these, preferred are 1,3-divinylbenzene, 1,4-divinylbenzene, bis(4-acryloyl-thiophenyl)sulfide and bis(4-methacryloyl-thiophenyl)sulfide.

Concrete examples of the isocyanate compound and the isothiocyanate compound include monoisocyanates such as methyl isocyanate, ethyl isocyanate, propyl isocyanate, isopropyl isocyanate, n-butyl isocyanate, sec-butyl isocyanate, tert-butyl isocyanate, pentyl isocyanate, hexyl isocyanate, octyl isocyanate, dodecyl isocyanate, cyclohexyl isocyanate, phenyl isocyanate and toluyl isocyanate; polyisocyanates such as diethylene diisocyanate, tetramethylene diisocyanate, hexamethylene diisocyanate, trimethyl hexamethylene diisocyanate, cyclohexane diisocyanate, 1,3-bis(isocyanatomethyl)cyclohexane, 1,4-bis(isocyanatomethyl)cyclohexane, isophorone diisocyanate, 2,5-bis(isocyanatomethyl) norbornene, 2,6-bis(isocyanatomethyl)decahydronaphthalene, 2,5-diisocyanato-1,4-dithiane, 2,5-bis(isocyanatomethyl)-1,4-dithiane, 2,6-bis(isocyanatomethyl)-1,4-dithiane, lysine triisocyanate, 2,4-tolylenediisocyanate, 2,6-tolylenediisocyanate, o-tolidine diisocyanate, 4,4'-diphenylmethane diisocyanate, diphenylether diisocyanate, 3-(2'-isocyanatocyclohexyl)propyl isocyanate, tris(phenylisocyanate)thiophosphate, isopropylidenebis(cyclohexylisocyanate), 2,2'-bis(4-isocyanatophenyl)propane, triphenylmethane triisocyanate, bis(diisocyanatetolyl)phenylmethane, 4,4',4"-triisocyanate-2,5-dimethoxyphenylamine, 3,3'-dimethoxybenzidine-4,4'-diisocyanate, 1,3-phenylenediisocyanate, 1,4-phenylenediisocyanate, 4,4'-diisocyanatobiphenyl, 4,4'-diisocyanato-3,3'-dimethylbiphenyl, dicyclohexylmethane-4,4'-diisocyanate, 1,1'-methylenebis(4-isocyanatobenzene), 1,1'-methylenebis(3-methyl-4-isocyanatobenzene), m-xylylenediisocyanate, p-xylylenediisocyanate, 1,3-bis(1-isocyanate-1-methylethyl)benzene, 1,4-bis(1-isocyanate-1-methylethyl)benzene, 1,3-bis(2-isocyanato-2-propyl)benzene, 2,6-bis(isocyanatomethyl)naphthalene, 1,5-naphthalenediisocyanate, bis(isocyanatomethyl)tetrahydrodicyclopentadiene, bis(isocyanatomethyl)dicyclopentadiene, bis(isocyanatomethyl)tetrahydrothiophene, bis(isocyanatomethyl)thiophene, 2,5-diisocyanatomethyl norbornene, bis(isocyanatomethyl)adamantane, 3,4-diisocyanatoselenofuran, 2,6-diisocyanate-9-selenabicyclononane,bis(isocyanatomethyl)selenofuran, 3,4-diisocyanate-2,5-diselenolane, dimer acid diisocyanate and 1,3,5-tri(1-isocyanatohexyl)isocyanurate; dimers obtained by biuret type reaction of these polyisocyanates; cyclized trimers of these polyisocyanates; adducts of these polyisocyanates and alcohol or thiol; and, further, compounds obtained by substituting all or part of isocyanate groups of the above compounds having one or more isocyanate groups per molecule with isothiocyanate groups.

Concrete examples of the epoxy compound and the episulfide compound include epoxy compounds including monoepoxy compounds such as ethylene oxide and propylene oxide; phenol type epoxy resins produced by condensation of epihalohydrin and a polyvalent phenol compound such as hydroquinone, catechol, resorcin, bisphenol A, bisphenol F, bisphenol ether, halogenated bisphenol A and a novolak resin; alcohol type epoxy compounds produced by condensation of epihalohydrin and an alcohol compound such as methanol, ethanol, propanol, butanol, ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerine, trimethylol propane, pentaerythritol, 1,3- and 1,4-cyclohexanediol, 1,3- and 1,4-cyclohexanedimethanol, hydrogenated bisphenol A, bisphenol A•ethylene oxide adduct and bisphenol A•propylene oxide adduct; urethane type epoxy compounds produced from the above alcohols or the phenol compounds and diisocyanate or the like, glycidyl ester type epoxy compounds produced by condensation of epihalohydrin and a carboxylic acid compound such as acetic acid, propionic acid, benzoic acid, adipic acid, sebacic acid, dodecanedicarboxylic acid, dimer acid, phthalic acid, isophthalic acid, terephthalic acid, tetrahydrophthalic acid, methyltetrahydrophtalic acid, hexahydrophthalic acid, het acid, nadic acid, maleic acid, succinic acid, fumaric acid, trimellitic acid, benzenetetracarboxylic acid, benzophenonetetracarboxylic acid, naphthalenedicarboxylic acid, diphenyldicarboxylic acid, acrylic acid, methacrylic acid, maleic acid and fumaric acid; amine type epoxy compounds produced by condensation of epihalohydrin and ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis-(3-aminopropyl)ether, 1,2-bis-(3-aminopropoxy)ethane, 1,3-bis-(3-aminopropoxy)-2,2'-dimethylpropane, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, isophoronediamine, 1,4-bisaminopropylpiperazine, m- or p-phenylenediamine, 2,4- or 2,6-tolylenediamine, m- or p-xylylenediamine, 1,5- or 2,6-naphthalenediamine, 4,4'-diaminodiphenylmethane, 4,4'-diaminodiphenylether, 2,2-(4,4'-diaminodiphenyl)propane, N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperazine, 2-methylpiperazine, 2,5- or 2,6-dimethylpiperazine, homopiperazine, 1,1-di-(4-piperidyl)-methane, 1,2-di-(4-piperidyl)-ethane, 1,3-di-(4-piperidyl)-propane or 1,4-di-(4-piperidyl)-butane; sulfur-containing epoxy compounds such as bis(β-epoxypropyl)sulfide, bis(β-epoxypropylthio)methane, 1,2-bis(β-epoxypropylthio)ethane, 1,3-bis(β-epoxypropylthio)propane, 1,2-bis(β-epoxypropylthio)propane, 1-(β-epoxypropylthio)-2-(β-epoxypropylthiomethyl)propane, 1,4-bis(β-epoxypropylthio)butane, 1,3-bis(β-epoxypropylthio)butane, 1-(β-epoxypropylthio)-3-(β-epoxypropylthiomethyl)butane, 1,5-bis(β-epoxypropylthio)pentane, 1-(β-epoxypropylthio)-4-(β-epoxypropylthiomethyl)pentane, 1,6-bis(β-epoxypropylthio)hexane, 1-(β-epoxypropylthio)-5-(β-epoxypropylthiomethyl)hexane, 1-(β-epoxypropylthio)-2-[(2-β-epoxypropylthioethyl)thio]ethane, 1-(β-epoxypropylthio)-2-[(2-(2-β-epoxypropylthioethyl)thioethyl)thio]ethane, tetrakiss(β-epoxypropylthiomethyl)methane, 1,1,1-tris(β-epoxypropylthiomethyl)propane, 1,5-bis(β-epoxypropylthio)-2-(β-epoxypropylthiomethyl)-3-thiapentane, 1,5-bis(β-epoxypropylthio)-2,4-bis(β-epoxypropylthiomethyl)-3-thiapentane, 1-(β-epoxypropylthio)-2,2-bis(β-epoxypropylthiomethyl)-4-thiahexane, 1,5,6-tris(β-epoxypropylthio)-4-(β-epoxypropylthiomethyl)-3-thiahexane, 1,8-bis(β-epoxypropylthio)-4-(β-epoxypropylthiomethyl)-3,6-dithiaoctane, 1,8-bis(β-epoxypropylthio)-4,5-bis(β-epoxypropylthiomethyl)-3,6-dithiaoctane, 1,8-bis(β-epoxypropylthio)-4,4-bis(β-epoxypropylthiomethyl)-3,6-dithiaoctane, 1,8-bis(β-epoxypropylthio)-2,4,5-tris(β-epoxypropylthiomethyl)-3,6-dithiaoctane, 1,8-bis(β-epoxypropylthio)-2,5-bis(β-epoxypropylthiomethyl)-3,6-dithiaoctane, 1,9-bis(β-epoxypropylthio)-5-(β-epoxypropylthiomethyl)-5-[(2-β-epoxypropylthioethyl)thiomethyl]-3,7-dithianonane, 1,10-bis(β-epoxypropylthio)-5,6-bis[(2-β-epoxypropylthioethyl)thio]-3,6,9-trithiadecane, 1,11-bis(β-epoxypropylthio)-4,8-bis(β-epoxypropylthiomethyl)-3,6,9-trithiaundecane, 1,11-bis(β-epoxypropylthio)-5,7-bis(β-epoxypropylthiomethyl)-3,6,9-trithiaundecane, 1,11-bis(β-epoxypropylthio)-5,7-[(2-β-epoxypropylthioethyl)thiomethyl]-3,6,9-trithiaundecane, 1,11-bis(β-epoxypropylthio)-4,7-bis(β-epoxypropylthiomethyl)-3,6,9-trithiaundecane, 1,3 and 1,4-bis(β-epoxypropylthio)cyclohexane, 1,3 and 1,4-bis(β-epoxypropylthiomethyl)cyclohexane, bis[4-(β-epoxypropylthio)cyclohexyl]methane, 2,2-bis[4-(β-epoxypropylthio)cyclohexyl]propane, bis[4-(β-epoxypropylthio)cyclohexyl]sulfide, 2,5-bis(β-epoxypropylthiomethyl)-1,4-dithiane, 2,5-bis(β-epoxypropylthioethylthiomethyl)-1,4-dithiane, 1,3 and 1,4-bis(β-epoxypropylthio)benzene, 1,3 and 1,4-bis(β-epoxypropylthiomethyl)benzene, bis[4-(β-epoxypropylthio)phenyl]methane, 2,2-bis[4-(β-epoxypropylthio)phenyl]propane, bis[4-(β-epoxypropylthio)phenyl]sulfide, bis[4-(β-epoxypropylthio)phenyl]sulfone and 4,4'-bis(β-epoxypropylthio)biphenyl; alicyclic epoxy compounds such as 3,4-epoxycyclohexyl-3,4-epoxycyclohexanecarboxylate, vinylcyclohexanedioxide, 2-(3,4-epoxycyclohexyl)-5,5-spiro-3,4-epoxycyclohexane-meth-dioxane and bis(3,4-epoxycyclohexyl)adipate; epoxy compounds produced by epoxidation of unsaturated compounds such as cyclopentadiene epoxide, epoxidated soybean oil, epoxidated polybutadiene and vinylcyclohexene epoxide; and epoxy compounds having an unsaturated group such as vinylphenyl glycidyl ether, vinylbenzyl glycidyl ether, glycidyl methacrylate, glycidyl acrylate and allyl glycidyl ether; and episulphide compounds obtained by substituting all or part of epoxy groups of the above epoxy compounds with episulphide groups.

The above compounds copolymerizable with a thiol compound may be used alone or in combination.

(Curing Method)

The cured product of the present invention 3 can be obtained by polymerizing the polymerizable composition of the present invention 3. The curing method is not specially limited similarly to the present invention 2 and it includes polymerization by heating, polymerization by irradiation with an active energy line, etc. Further, these methods may be combined. As a thermal polymerization initiator and a photopolymerization initiator which are used in the polymerization, there may be used the same thermal polymerization initiators and photopolymerization initiators as those described in the present invention 2. Photopolymerization is preferred for a use in which a short-time polymerization or a low-temperature polymerization is required.

When the polymerization composition contains the enic compound and the thiol compound, it is preferred to use a radical generation type polymerization initiator.

Further, when the polymerizable composition contains the epoxy compound and the episulphide compound, it is preferred to use, as a polymerization catalyst, amines, phosphines, quaternary ammonium salts, quaternary phosphonium salts, tertiary sulfonium salts and secondary iodonium salts, which are usually used as an epoxy curing agent.

When the polyerizable composition contains the thiol compound and an iso(thia)cyanate compound, it is preferred to use an organic tim compound such as dibutyltindilaurate, dibutyltinacetate, dibutyltindichloride or tributyltinchloride as an urethane polymerization accelerator or amines as a polymerization catalyst.

The polymerizable composition of the present invention 3 may contain the agents, such as a sensitizer or an ultraviolet absorber, recited in the present invention 2, as required, in such a range that the effects of the present invention 3 are not impaired. Before polymerizing the polymerizable composition of the present invention 3, similarly to the present invention 2, treatment such as degassing treatment or filtration treatment may be carried out as required.

As for a method in which part or all of the compounds contained in the polymerizable composition of the present invention 3 are preliminarily reacted, a method of molding the cured product, a light source for photopolymerization and the like, the same methods and light source as those explained in the present invention 2 can be similarly adopted.

Effect of the Invention

The composition containing 3,3'-thiobis(propane-1,2-dithiol) and one or more enic compounds, provided by the present invention, is photocurable, and a cured product having a high refractive index and adequate hardness can be obtained.

There can be obtained a cured product having a high refractive index and high hardness by curing the polymerizable composition containing the sulfur-containing polyenic compound of the present invention.

There can be obtained a cured product having a high refractive index by curing the polymerizable composition containing the sulfur-containing polythiol compound of the present invention.

EXAMPLES

The present invention will be concretely explained with reference to Examples, while the present invention shall not be limited thereto. Obtained cured products were evaluated for refractive index and pencil hardness according to the following test methods.

Refractive index: Measured with an Abbe refractomete at 25° C.

Pencil hardness: Measured according to JIS 5400.

Synthesis Example 1

A flask equipped with a stirrer, a thermometer and a nitrogen-introducing tube was charged with 50 g of bis(β-epithiopropyl) sulfide, 3.7 g of potassium hydroxide and 1,000 ml of methanol as a solvent, and the mixture was allowed to react for 3 hours while blowing hydrogen sulfide in at 10° C. and maintaining a saturation state. After the reaction, excess hydrogen sulfide was removed and the methanol was distilled off, to obtain 55.8 g of a colorless liquid product. The above product was separated and purified by a silica gel column chromatography, to obtain 20.4 g of 3,3'-thiobis(propane-1,2-dithiol) and 17.8 g of 1,2-epithio-6,7-dimercapt-4-thiaheptane.

Synthesis Example 2

A four-necked flask having a volume of 200 ml and equipped with a stirrer, a thermometer and a dropping funnel was charged with 60.0 g (0.30 mol) of a 20% sodium hydroxide aqueous solution and 12.3 g (0.05 mol) of 3,3'-thiobis(propane-1,2-dithiol) was dropwise added from the dropping funnel over 5 minutes while maintaining a temperature at 30° C. or lower. Further, the mixture was stirred for 1 hour while maintaining a reaction temperature of 30° C. or lower. The reaction temperature was decreased to 0° C. and then 23.0 (0.30 mol) of allyl chloride was dropwise added over 15 minutes. After the dropwise addition, the resultant mixture was further stirred for 1 hour at the same temperature. A reaction product was extracted with hexane and then washed with water. Then, the reaction product was concentrated under vacuum to remove the hexane and excess allyl chloride. Then, the concentrate was dissolved in mixed solvents of methylene chloride and hexane, the resultant solution was passed through a column filled with silica gel, and then, the solution was again concentrated under vacuum, to obtain 19.9 g of 3,3'-thiobis(1,2-di(1-propenylthio)propane) represented by the formula (10),

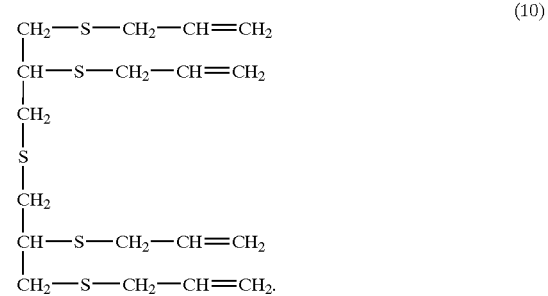

(Elemental analysis) C: measured value 53.2% (calculated value 53.1%), H: measured value 7.6% (calculated value 7.5%), O: measured value 0.2% (calculated value 0.0%), S: measured value 39.0% (calculated value 39.4%), [FD-MS] m/z=406 (M+), [1H-NMR] (solvent: CDCl3) δ=2.82–2.93 (m, 4H), 2.95–2.98 (m, 6H), 3.15–3.17 (m, 4H), 3.22–3.23 (m, 4H), 5.09–5.17 (m, 8H), 5.74–5.87 (m, 4H), [13C-NMR](solvent: CDCl3)δ=34.6, 34.9, 35.6, 37.5, 44.4, 117.3, 134.2, 134.4

Synthesis Example 3

A four-necked flask having a volume of 100 ml and equipped with a stirrer, a thermometer and a dropping funnel was charged with 1.6 g (6.5 mmol) of 3,3'-thiobis(propane-1,2-dithiol), 3.5 g (55 mmol) of methacroyl chloride and 30 ml of methylene chloride, and the mixture was cooled to −10° C. Pyridine was dropwise added from the dropping funnel over 1 hour while maintaining a reaction temperature at −8° C. or lower. After the dropwise addition, the resultant mixture was stirred for 1 hour at a reaction temperature of 30° C. A reaction product was washed with an acid and then water. 1,000 ppm of methyl hydroquinone was added to the reaction product and then the resultant mixture was concentrated under vacuum. Then, the obtained concentrate was dissolved in mixed solvents of methylene chloride and hexane, the resultant solution was passed through a column filled with silica gel, and then, the solution was again concentrated under vacuum, to obtain 3,3'-thiobis(1,2-dimethacroylthiopropane) represented by the following formula (11),

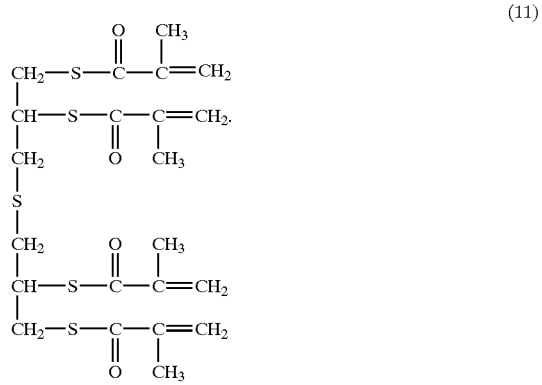

(11)

(Elemental analysis) C: measured value 51.0% (calculated value 50.9%), H: measured value 5.9% (calculated value 5.8%), O: measured value 12.6% (calculated value 12.4%), S: measured value 30.5% (calculated value 30.9%), [FD-MS]m/z=518 (M+), [1H-NMR] (solvent: CDCl3) δ=2.96–3.07 (m, 8H), 3.26–3.32(m, 2H), 5.67–5.71 (m, 4H), 6.25–6.38 (m, 8H), [13C-NMR] (solvent: CDCl3)δ=31.6, 39.5, 42.6, 126.8, 134.9, 189.8

Example 1

35 parts by weight of 3,3'-thiobis(propane-1,2-dithiol) of Synthesis Example 1, 65 parts by weight of 3,3'-thiobis(1,2-di(1-propenylthio)propane) of Synthesis Example 2 and 1 part of 2,2-dimethoxy-2-phenylacetophenone were mixed enough and defoaming was carried out by decompression, to obtain a photocurable composition. The photocurable composition was injected into a 3 mm-thick mold composed of two glass plates and a rubber ring. The photocurable composition was irradiated with light of a 100 W/cm metal halide lamp at a distance of 30 cm from the light source for 30 minutes, thereby curing the photocurable composition. The cured composition was allowed to cool down to room temperature, and then the cured composition was released from the mold, to obtain a cured product. The obtained cured product was measured for refractive index and pencil hardness. Table 1 shows the results thereof.

Example 2

27 parts by weight of 3,3'-thiobis(propane-1,2-dithiol) of Synthesis Example 1, 50 parts by weight of 3,3'-thiobis(1,2-di(1-propenylthio)propane)of Synthesis Example 2, 23 parts by weight of bis(4-methacroyl-thiophenyl)sulfide and 1 part by weight of 2,2-dimethoxy-2-phenylacetophenone were mixed enough and defoaming was carried out by decompression, to obtain a photocurable composition. A cured product was obtained from the above photocurable composition in the same manner as in Example 1. The obtained cured product was measured for refractive index and pencil hardness. Table 1 shows the results thereof.

Example 3

30 parts by weight of 3,3'-thiobis(propane-1,2-dithiol) of Synthesis Example 1, 70 parts by weight of 3,3'-thiobis(1,2-dimethacroylthiopropane) of Synthesis Example 3 and 1 part by weight of 2,2-dimethoxy-2-phenylacetophenone were mixed enough and defoaming was carried out by decompression, to obtain a photocurable composition. A cured product was obtained from the above photocurable composition in the same manner as in Example 1. The obtained cured product was measured for refractive index and pencil hardness. Table 1 shows the results thereof.

Example 4

40 parts by weight of 3,3'-thiobis(propane-1,2-dithiol) of Synthesis Example 1, 60 parts by weight of divinylbenzene and 1 part by weight of 2,2-dimethoxy-2-phenylacetophenone were mixed enough and defoaming was carried out by decompression, to obtain a photocurable composition. A cured product was obtained from the above photocurable composition in the same manner as in Example 1. The obtained cured product was measured for refractive index and pencil hardness. Table 1 shows the results thereof.

Example 5

27 parts by weight of 3,3'-thiobis(propane-1,2-dithiol) of Synthesis Example 1, 50 parts by weight of divinylbenzene, 23 parts by weight of bis(4-methacroyl-thiophenyl)sulfide and 1 part by weight of 2,2-dimethoxy-2-phenylacetophenone were mixed enough and defoaming was carried out by decompression, to obtain a photocurable composition. A cured product was obtained from the above photocurable composition in the same manner as in Example 1. The obtained cured product was measured for refractive index and pencil hardness. Table 1 shows the results thereof.

Example 6

26 parts by weight of 3,3'-thiobis(propane-1,2-dithiol) of Synthesis Example 1, 45 parts by weight of divinylbenzene, 22 parts by weight of bis(4-methacroyl-thiophenyl)sulfide, 7 parts by weight of trimethylolpropane trimethacrylate and 1 part by weight of 2,2-dimethoxy-2-phenylacetophenone were mixed enough and defoaming was carried out by decompression, to obtain a photocurable composition. A cured product was obtained from the above photocurable composition in the same manner as in Example 1. The obtained cured product was measured for refractive index and pencil hardness. Table 1 shows the results thereof.

Comparative Example 1

40 parts by weight of 4,8-bis(mercaptomethyl)-3,6,9-trithia-1,11-undecanedithiol represented by the following formula (12), 60 parts by weight of 3,3'-thiobis(1,2-di(1-propenylthio)propane)of Synthesis Example 2 and 1 part by weight of 2,2-dimethoxy-2-phenylacetophenone were mixed enough and defoaming was carried out by decompression, to obtain a photocurable composition. A cured product was obtained from the above photocurable composition in the same manner as in Example 1. The obtained cured product was measured for refractive index and pencil hardness. Table 1 shows the results thereof.

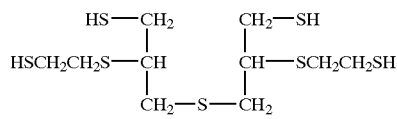
(12)

Comparative Example 2

45 parts by weight of 4,8-bis(mercaptomethyl)-3,6,9-trithia-1,11-undecanedithiol represented by the formula (12), 55 parts by weight of divinylbenzene and 1 part by weight of 2,2-dimethoxy-2-phenylacetophenone were mixed enough and defoaming was carried out by decompression, to obtain a photocurable composition. A cured product was obtained from the above photocurable composition in the same manner as in Example 1. The obtained cured product was measured for refractive index and pencil hardness. Table 1 shows the results thereof.

Comparative Example 3

35 parts by weight of 3,3'-thiobis(propane-1,2-dithiol) of Synthesis Example 1, 65 parts by weight of trimethylolpropane trimethacrylate and 1 part by weight of 2,2-dimethoxy-2-phenylacetophenone were mixed enough and defoaming was carried out by decompression, to obtain a photocurable composition. A cured product was obtained from the above photocurable composition in the same manner as in Example 1. The obtained cured product was measured for refractive index and pencil hardness. Table 1 shows the results thereof.

Comparative Example 4

20 parts by weight of 3,3'-thiobis(propane-1,2-dithiol) of Synthesis Example 1, 80 parts by weight of bis(β-methacryloyloxyethylthio)xylylene represented by the following formula (13) and 1 part by weight of 2,2-dimethoxy-2-phenylacetophenone were mixed enough and defoaming was carried out by decompression, to obtain a photocurable composition. A cured product was obtained from the above photocurable composition in the same manner as in Example 1. The obtained cured product was measured for refractive index and pencil hardness. Table 1 shows the results thereof.

TABLE 1

$$CH_2{=}\overset{CH_3}{\underset{\underset{O}{\|}}{C}}COCH_2CH_2SCH_2{-}\!\!\!\left\langle\!\!\!\bigcirc\!\!\!\right\rangle\!\!\!{-}CH_2SCH_2CH_2O\overset{CH_3}{\underset{\underset{O}{\|}}{C}}C{=}CH_2 \quad (13)$$

| | Composition = part by weight | $n_D$ | Pencil hardness |
|---|---|---|---|
| Example 1 | A/P/X = 35/65/1 | 1.658 | H |
| Example 2 | A/P/R/X = 27/50/23/1 | 1.663 | 2H |
| Example 3 | A/Q/X = 30/70/1 | 1.651 | 3H |
| Example 4 | A/S/X = 40/60/1 | 1.656 | F |
| Example 5 | A/S/R/X = 27/50/23/1 | 1.657 | H |
| Example 6 | A/S/R/T/X = 26/45/22/7/1 | 1.653 | 2H |
| Comparative Example 1 | B/P/X = 40/60/1 | 1.649 | HB |
| Comparative Example 2 | B/S/X = 45/55/1 | 1.642 | HB |

TABLE 1-continued $$CH_2{=}\overset{CH_3}{\underset{\underset{O}{\|}}{C}}COCH_2CH_2SCH_2{-}\!\!\!\left\langle\!\!\!\bigcirc\!\!\!\right\rangle\!\!\!{-}CH_2SCH_2CH_2O\overset{CH_3}{\underset{\underset{O}{\|}}{C}}C{=}CH_2 \quad (13)$$

| | Composition = part by weight | $n_D$ | Pencil hardness |
|---|---|---|---|
| Comparative Example 3 | A/T/X = 35/65/1 | 1.598 | 2H |
| Comparative Example 4 | A/U/X = 20/80/1 | 1.628 | H |

Compound Codes

A: 3,3'-thiobis(propane-1,2-dithiol)

B: 4,8-bis(mercaptomethyl)-3,6,9-trithia-1,11-undecanedithiol

P: 3,3'-thiobis(1,2-di(1-propenylthio)propane)

Q: 3,3'-thiobis(1,2-di(methacryloylthio)propane)

R: bis(4-methacroyl-thiophenyl)sulfide

S: divinylbenzene

T: trimethylolpropane trimethacrylate

U: bis(β-methacryloyloxyethylthio)xylylene

X: 2,2-dimethoxy-2-phenylacetophenone

Synthesis Example 4

A four-necked 200-ml flask equipped with a stirrer, a thermometer and a dropping funnel was charged with 10.0 g (41 mmol) of a sulfur-containing tetrathiol compound of the formula (26),

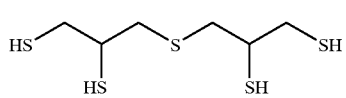
(26)

18.0 g (201 mmol) of acryloyl chloride and 60 ml of dichloromethane. Mixed solutions of 14.0 g (177 mmol) of pyridine and 40 ml of dichloromethane were dropwise added over 1.5 hours from the dropping funnel in a shading nitrogen atmosphere while maintaining a temperature of 0° C. or lower. The mixture was further stirred for 3 hours at 0° C. Then, the reaction mixture was washed with diluted hydrochloric acid, a sodium bicarbonate aqueous solution and water, and then, the solvents were removed by vacuum concentration. Then, the concentrate was dissolved in mixed solvents of hexane and ethyl acetate, the resultant solution was passed through a column filled with silica gel, and then, it was again concentrated under vacuum, thereby obtaining 11.4 g of a compound, which was a yellow transparent liquid, of the formula (28).

(28)

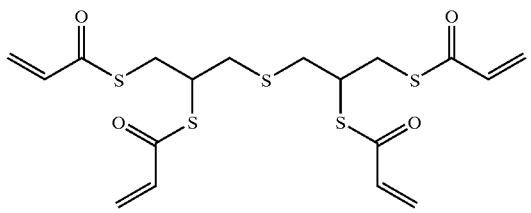

Analysis results for deciding the structure of the above compound are shown below.
(Elemental analysis) C: measured value 46.6% (calculated value 46.7%), H: measured value 4.9% (calculated value 4.8%), O: measured value 14.0% (calculated value 13.8%), S: measured value 34.5% (calculated value 34.7%), [FD-MS]m/z=462 (M+), [1H-NMR] (solvent: CDCl3) δ=1.93–2.01 (m, 12H), 2.90–3.02(m, 4H), 3.35–3.40 (m, 2H), 3.47–3.52(m, 2H), 3.91–3.94(m, 2H), 5.30(s, 4H), 5.07–5.09(m, 4H), [13C-NMR](solvent: CDCl3)δ=18.0, 18.1, 31.9, 37.1, 44.2, 123.6, 123.8, 143.5, 192.1

Synthesis Example 5

A four-necked 200-ml flask equipped with a stirrer, a thermometer and a dropping funnel was charged with 10.0 g (41 mmol) of a sulfur-containing tetrathiol compound of the formula (26) and 40 ml of methanol. 26.4 g (231 mmol) of 35% sodium hydroxide aqueous solution was dropwise added over 2.0 hours from the dropping funnel in a shading nitrogen atmosphere while maintaining a temperature of 10° C. or lower. Then, 33.6 g (220 mmol) of chloromethylstyrene was dropwise added over 2.5 hours from the dropping funnel while maintaining a temperature of 10° C. or lower. Further, the mixture was stirred for 2.0 hours at 20° C. Then, the reaction solution was extracted with ethyl acetate, the extract layer was washed with diluted hydrochloric acid, a sodium bicarbonate aqueous solution and water, and then, the solvent was removed by vacuum concentration. Then, the concentrate was dissolved in mixed solvents of hexane and ethyl acetate, the resultant solution was passed through a column filled with silica gel, and then, it was again concentrated under vacuum, thereby obtaining 27.1 g of a compound, which was a yellow transparent liquid, of the formula (30), (30)

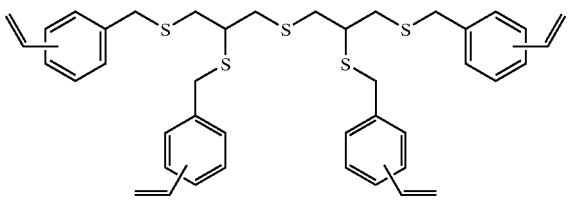

Analysis results for deciding the structure of the above compound are shown below.
(Elemental analysis) C: measured value 71.0% (calculated value 70.9%), H: measured value 6.6% (calculated value 6.5%), O: measured value 0.1% (calculated value 0.0%), S: measured value 22.3% (calculated value 22.6%), [FD-MS] m/z=711 (M+), [1H-NMR] (solvent: CDCl3) δ=2.67–2.75 (m, 10H), 3.64–3.70(m, 8H), 5.22–5.25 (m, 4H), 5.70–5.75 (m, 4H), 6.65–6.72 (m, 4H), 7.20–7.34 (m, 16H), [13C-NMR] (solvent: CDCl3)δ=35.7, 35.8, 36.9, 37.6, 45.0, 113.9, 125.0, 126.7, 128.4, 129.1, 136.4, 137.9, 138.4

Synthesis Example 6

A four-necked 200-ml flask equipped with a stirrer, a thermometer and a dropping funnel was charged with 20.0 g (56 mmol) of mercaptomethylstyrene, 9.0 g (132 mmol) of sodium ethoxide and 100 ml of methanol. 10.0 g (56 mmol) of a diepisulfide compound of the formula (31), (31)

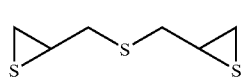

was dropwise added over 0.5 hour from the dropping funnel in a shading nitrogen atmosphere while maintaining a temperature of 25° C. or lower. Further, the mixture was stirred for 5.0 hours at 25° C. Then, the reaction solution was extracted with ethyl acetate, the extract layer was washed with a sodium bicarbonate aqueous solution, diluted hydrochloric acid, a sodium bicarbonate aqueous solution and water, and then, the solvent was removed by vacuum concentration. Then, the concentrate was dissolved in mixed solvents of hexane and ethyl acetate, the resultant solution was passed through a column filled with silica gel, and then, it was again concentrated under vacuum, thereby obtaining 14.7 g of a compound, which was a yellow transparent liquid, of the formula (32), (32)

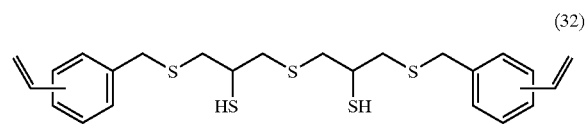

Analysis results for deciding the structure of the above compound are shown below.
(Elemental analysis) C: measured value 60.0% (calculated value 60.2%), H: measured value 6.6% (calculated value 6.3%), O: measured value 0.2% (calculated value 0.0%), S: measured value 33.2% (calculated value 33.5%), [FD-MS] m/z=478 (M+), [1H-NMR] (solvent: CDCl3) δ=1.84–1.87 (m, 2H), 2.84–3.02(m, 8H), 3.20–3.31 (m, 2H), 3.71–3.74 (m, 4H), 5.22–5.26 (m, 2H), 5.71–5.76 (m, 2H), 6.66–6.73 (m, 2H), 7.25–7.37 (m, 8H), [13C-NMR] (solvent: CDCl3) δ=35.6, 36.7, 38.8, 42.8, 113.9, 126.4, 129.1, 136.3

Synthesis Example 7

A four-necked 200-ml flask equipped with a stirrer, a thermometer and a dropping funnel was charged with 15.0 g (136 mmol) of thiophenol, 9.0 g (132 mmol) of sodium ethoxide and 100 ml of methanol. 10.0 g (56 mmol) of a diepisulfide compound of the formula (31) was dropwise added over 0.5 hour from the dropping funnel under a nitrogen atmosphere while maintaining a temperature of 25° C. or lower. Further, the mixture was stirred for 5 hours at 25° C. Then, the reaction solution was extracted with ethyl acetate, the extract layer was washed with a sodium bicarbonate aqueous solution, diluted hydrochloric acid, a sodium bicarbonate aqueous solution and water, and then, the solvent was removed by vacuum concentration. Then, the concentrate was dissolved in mixed solvents of hexane and ethyl acetate, the resultant solution was passed through a column filled with silica gel, and then, it was again concentrated under vacuum, thereby obtaining 18.7 g of a compound, which was a yellow transparent liquid, of the formula (33),

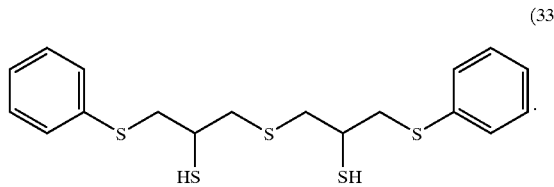

(33)

Then, a four-necked 200-ml flask equipped with a stirrer, a thermometer and a dropping funnel was charged with 18.7 g (47 mmol) of the above compound of the formula (19), 10.0 g (110 mmol) of acryloyl chloride and 60 ml of dichloromethane. Mixed solutions of 9.0 g (114 mmol) of pyridine and 40 ml of dichloromethane were dropwise added over 1.5 hours from the dropping funnel under a shading nitrogen atmosphere while maintaining a temperature of 0° C. or lower. Further, the mixture was stirred for 3.0 hours at 0° C. Then, the reaction solution was washed with diluted hydrochloric acid, a sodium bicarbonate aqueous solution and water, and then, the solvents were removed by vacuum concentration. Then, the concentrate was dissolved in mixed solvents of hexane and ethyl acetate, the resultant solution was passed through a column filled with silica gel, and then, it was again concentrated under vacuum, thereby obtaining 15.7 g of a compound, which was a yellow transparent liquid, of the formula (34),

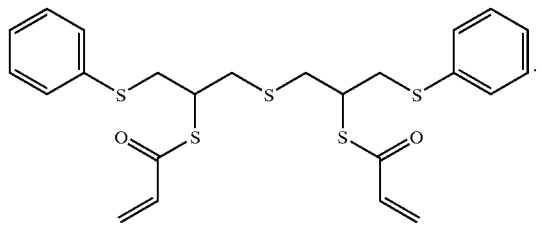

(34)

Analysis results for deciding the structure of the above compound are shown below.

(Elemental analysis) C: measured value 56.9% (calculated value 56.9%), H: measured value 5.2% (calculated value 5.2%), O: measured value 6.4% (calculated value 6.3%), S: measured value 31.5% (calculated value 31.7%), [FD-MS] m/z=506 (M+), [1H-NMR] (solvent: CDCl3) δ=2.80–3.18 (m, 10H), 5.65–5.71(m, 2H), 6.24–6.39 (m, 4H), 7.19–7.39 (m, 10H), [13C-NMR] (solvent: CDCl3)δ=39.9, 40.3, 41.4, 125.9, 126.8, 129.1, 130.1, 134.0, 135.0, 189.8

Example 7

3 parts by weight of 2,2-dimethoxy-2-phenylacetophenone was added to 100 parts by weight of a compound (to be referred to as "VI" hereinafter) represented by the following formula (35),

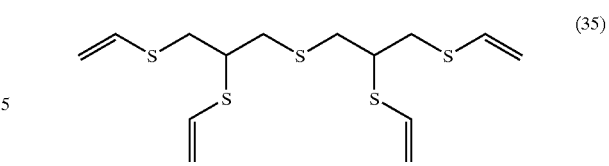

(35)

and the mixture was sufficiently stirred. Degassing was carried out by stirring the mixture under a reduced pressure. The degassed mixture was injected into a 2 mm-thick mold composed of two glass plates and a rubber ring. Then, the mixture was irradiated with light of a 100 W/cm metal halide lamp at a distance of 30 cm from the light source for 60 minutes, thereby curing the mixture. The cured mixture was allowed to cool down to room temperature, and then the cured mixture was released from the mold, to obtain a cured product. The obtained cured product was measured for refractive index and pencil hardness. Table 2 shows the results thereof.

Examples 8–14

A compound (to be referred to as "AR" hereinafter) represented by the formula (10), a compound (to be referred to as "AC" hereinafter) represented by the formula (28), a compound (to be referred to as "MA" hereinafter) represented by the formula (11), a compound (to be referred to as "ST" hereinafter) represented by the formula (36),

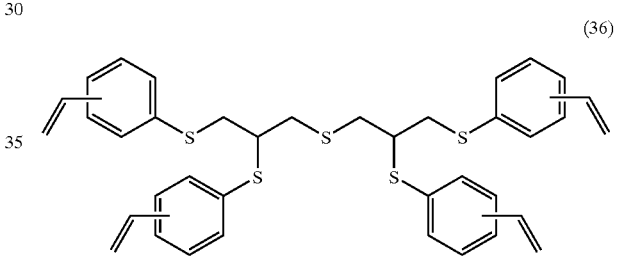

(36)

a compound (to be referred to as "MST" hereinafter) represented by the formula (30), a compound (to be referred to as "EST" hereinafter) represented by the formula (37),

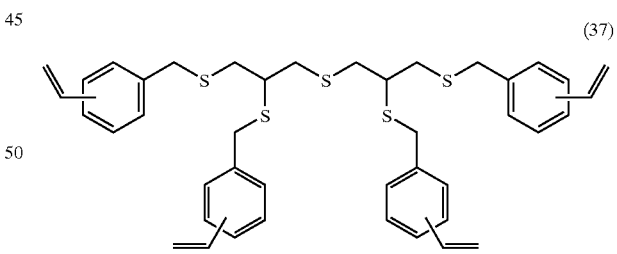

(37)

and a compound (to be referred to as "BAC" hereinafter) represented by the formula (34) were cured in the same manner as in Example 7, to obtain cured products. The cured products were measured for refractive index and pencil hardness, and Table 2 shows the results.

Example 15

A composition formed of 71 parts by weight of a compound (to be referred to as "MMST" hereinafter) represented by the formula (32) and 29 parts by weight of trimethylolpropane triacrylate (to be referred to as "TMPTA" hereinafter) was cured in the same manner as in Example 7, to obtain a cured product. The cured product was measured for refractive index and pencil hardness, and Table 2 shows the results.

Comparative Examples 5–6

Bisphenol A diglycidyl ether diacrylate (to be referred to as "BPDGDA" hereinafter) and TMPTA were cured in the same manner as in Example 7, to obtain cured products. The cured products were measured for refractive index and pencil hardness, and Table 2 shows the results.

TABLE 2

| | Composition (weight ratio) | Functional group ratio (C=C/SH) | Refractive Index | Pencil hardness |
|---|---|---|---|---|
| Example | | | | |
| 7 | VI = 100 | — | 1.689 | 3H |
| 8 | AR = 100 | — | 1.648 | 2H |
| 9 | AC = 100 | — | 1.661 | 5H |
| 10 | MA = 100 | — | 1.605 | 4H |
| 11 | ST = 100 | — | 1.690 | 4H |
| 12 | MST = 100 | — | 1.668 | 4H |
| 13 | EST = 100 | — | 1.649 | 3H |
| 14 | BAC = 100 | — | 1.657 | 4H |
| 15 | MMST/TMPTA = 71/29 | 2.0 | 1.639 | 3H |
| Comparative Example | | | | |
| 5 | BPDGDA = 100 | — | 1.546 | 4H |
| 6 | TMPTA = 100 | — | 1.522 | 5H |

Example 16

0.5 part by weight of t-butylperoxyneodecanate was added to 100 parts by weight of VI, and the mixture was sufficiently stirred. Degassing was carried out by stirring the mixture under a reduced pressure. The degassed mixture was injected into a 2 mm-thick mold composed of two glass plates and a rubber ring. Then, the mixture was temperature-increased from 30° C. to 100° C. at a constant rate over 10 hours, to cure the mixture. The cured mixture was allowed to cool down to room temperature, and then the cured mixture was released from the mold, to obtain a cured product. The obtained cured product was measured for refractive index and pencil hardness. Table 3 shows the results thereof.

Examples 17 to 23

AR, AC, MA, ST, MST, EST AND BAC were cured in the same manner as in Example 16, to obtain cured products. The cured products were measured for refractive index and pencil hardness. Table 3 shows the results thereof.

Example 24

A composition formed of 71 parts by weight of MMST and 29 parts by weight of TMPTA was cured in the same manner as in Example 16, to obtain a cured product. The cured product was measured for refractive index and pencil hardness, and Table 3 shows the results.

Comparative Examples 7–8

BPDGDA and TMPTA were cured in the same manner as in Example 16, to obtain cured products. The cured products were measured for refractive index and pencil hardness, and Table 3 shows the results.

TABLE 3

| | Composition (weight ratio) | Functional group ratio (C=C/SH) | Refractive index | Pencil hardness |
|---|---|---|---|---|
| Example | | | | |
| 16 | VI = 100 | — | 1.689 | 3H |
| 17 | AR = 100 | — | 1.648 | 2H |
| 18 | AC = 100 | — | 1.661 | 5H |
| 19 | MA = 100 | — | 1.605 | 4H |
| 20 | ST = 100 | — | 1.690 | 4H |
| 21 | MST = 100 | — | 1.668 | 4H |
| 22 | EST = 100 | — | 1.649 | 3H |
| 23 | BAC = 100 | — | 1.657 | 4H |
| 24 | MMST/TMPTA = 71/29 | 2.0 | 1.639 | 3H |
| Comparative Example | | | | |
| 7 | BPDGDA = 100 | — | 1.546 | 4H |
| 8 | TMPTA = 100 | — | 1.522 | 5H |

Example 25

3 parts by weight of 2,2-dimethoxy-2-phenylacetophenone was added to a composition containing 74 parts by weight of VI and 26 parts by weight of a tetrathiol compound (to be referred to as "TMTH" hereinafter) represented by the formula (26), and the mixture was sufficiently stirred. Defoaming was carried out by stirring the mixture under a reduced pressure. The degassed mixture was injected into a 2 mm-thick mold composed of two glass plates and a rubber ring. Then, the mixture was irradiated with light of a 100 W/cm metal halide lamp at a distance of 30 cm from the light source for 60 minutes, thereby curing the mixture. The cured mixture was allowed to cool down to room temperature, and then the cured mixture was released from the mold, to obtain a cured product. The obtained cured product was measured for refractive index and pencil hardness. Table 4 shows the results thereof.

Examples 26 to 32

Polynic compounds of AR, AC, MA, ST, MST, EST and BAC were each mixed with TMTH in ratios shown in Table 4, to obtain compositions. The compositions were each cured in the same manner as in Example 25, to obtain cured products. The cured products were measured for refractive index and pencil hardness Table 4 shows the results thereof.

TABLE 4

| Example | Composition (weight ratio) | Functional group ratio (C=C/SH) | Refractive Index | Pencil hardness |
|---|---|---|---|---|
| 25 | VI/TMTH = 74/26 | 2.0 | 1.710 | 3H |
| 26 | AR/TMTH = 77/23 | 2.0 | 1.673 | 2H |
| 27 | AC/TMTH = 80/20 | 2.0 | 1.682 | 4H |
| 28 | MA/TMTH = 81/19 | 2.0 | 1.628 | 4H |
| 29 | ST/TMTH = 84/16 | 2.0 | 1.702 | 4H |
| 30 | MST/TMTH = 85/15 | 2.0 | 1.681 | 4H |

TABLE 4-continued

| Example | Composition (weight ratio) | Functional group ratio (C=C/SH) | Refractive Index | Pencil hardness |
|---|---|---|---|---|
| 31 | EST/TMTH = 86/14 | 2.0 | 1.663 | 3H |
| 32 | BAC/TMTH = 89/11 | 2.0 | 1.667 | 4H |

Example 33

0.5 part by weight of t-butylperoxyneodecanate was added to a composition containing 74 parts by weight of VI and 26 parts by weight of TMTH, and the mixture was sufficiently stirred. Defoaming was carried out by stirring the mixture under a reduced pressure. The degassed mixture was injected into a 2 mm-thick mold composed of two glass plates and a rubber ring. Then, the mixture was temperature-increased from 30° C. to 100° C. at a constant rate over 10 hours, to cure the mixture. The cured mixture was allowed to cool down to room temperature, and then the cured mixture was released from the mold, to obtain a cured product. The obtained cured product was measured for refractive index and pencil hardness. Table 5 shows the results thereof.

Examples 34–40

Polyenic compounds of AR, AC, MA, ST, MST, EST and BAC were each mixed with TMTH in ratios shown in Table 5, to obtain compositions. The compositions were each cured in the same manner as in Example 33, to obtain cured products. The cured products were measured for refractive index and pencil hardness. Table 5 shows the results thereof.

TABLE 5

| Example | Composition (weight ratio) | Functional group ratio (C=C/SH) | Refractive Index | Pencil hardness |
|---|---|---|---|---|
| 33 | VI/TMTH = 74/26 | 2.0 | 1.710 | 3H |
| 34 | AR/TMTH = 77/23 | 2.0 | 1.673 | 2H |
| 35 | AC/TMTH = 80/20 | 2.0 | 1.682 | 4H |
| 36 | MA/TMTH = 81/19 | 2.0 | 1.628 | 4H |
| 37 | ST/TMTH = 84/16 | 2.0 | 1.702 | 4H |
| 38 | MST/TMTH = 85/15 | 2.0 | 1.681 | 4H |
| 39 | EST/TMTH = 86/14 | 2.0 | 1.663 | 3H |
| 40 | BAC/TMTH = 89/11 | 2.0 | 1.667 | 4H |

Synthesis Example 8

A four-necked 200-ml flask equipped with a stirrer, a thermometer and a dropping funnel was charged with 24.7 g (224 mmol) of thiophenol, 0.04 g (0.59 mmol) of sodium ethoxide and 100 ml of methanol, and 10.0 g (56 mmol) of a diepisulfide compound of the formula (31) was dropwise added over 30 minutes from the dropping funnel in a nitrogen atmosphere while maintaining a temperature of 25° C. or lower. After the completion of the dropwise addition, the mixture was stirred for 3 hours while maintaining a reaction temperature of 25° C. or lower. Then, the solvent was concentrated by decompression, methylene chloride was added, the resultant mixture was washed with diluted hydrochloric acid and water, and the solvent was removed by decompression, to obtain a product. The obtained product was dissolved in mixed solvents of methylene chloride and hexane, the resultant solution was passed through a column filled with silica gel, and then, it was again concentrated under vacuum, thereby obtaining 17.8 g of a compound, which was a colorless transparent liquid, of the formula (33).

Analysis results for deciding the structure of the above compound are shown below.

(Elemental analysis) C: measured value 54.5% (calculated value 54.2%), H: measured value 5.7% (calculated value 5.6%), O: measured value 0.2% (calculated value 0.0%), S: measured value 39.6% (calculated value 40.2%), [FD-MS] m/z=398 (M+), [1H-NMR] (solvent: CDCl3) δ=2.08–2.23 (d, 2H), 2.82–2.96(m, 4H), 3.06–3.29 (m, 6H), 7.14–7.39(m, 10H)

Synthesis Example 9

A four-necked 200-ml flask equipped with a stirrer, a thermometer and a dropping funnel was charged with 34.6 g (224 mmol) of 2,2'-thiodiethanethiol, 0.04 g (0.59 mmol) of sodium ethoxide and 100 ml of methanol, and 10.0 g (56 mmol) of a diepisulfide compound of the formula (31) was dropwise added over 30 minutes from the dropping funnel in a nitrogen atmosphere while maintaining a temperature of 25° C. or lower. After the completion of the dropwise addition, the mixture was stirred for 3 hours while main-taining a reaction temperature of 25° C. or lower. Then, the solvent was concentrated by decompression, methylene chloride was added, the resultant mixture was washed with diluted hydrochloric acid and water, and the solvent was removed by decompression, to obtain a product. The obtained product was dissolved in mixed solvents of methylene chloride and hexane, the resultant solution was passed through a column filled with silica gel, and then, it was again concentrated under vacuum, thereby obtaining 12.0 g of a compound, which was a colorless transparent liquid, of the formula (46),

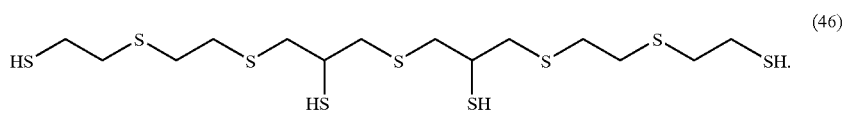

(46)

Analysis results for deciding the structure of the above compound are shown below.

(Elemental analysis) C: measured value 34.6% (calculated value 34.5%), H: measured value 6.2% (calculated value 6.2%), O: measured value 0.1% (calculated value 0.0%), S: measured value 59.1% (calculated value 59.3%), [FD-MS] m/z=487 (M+), [1H-NMR] (solvent: CDCl3) δ=1.88–1.98 (t, 2H), 2.23–2.35(d, 2H), 2.72–3.58 (m, 26H)

Synthesis Example 10

A four-necked 200-ml flask equipped with a stirrer, a thermometer and a dropping funnel was charged with 31.9 g (224 mmol) of 1,4-benzenedithiol, 0.04 g (0.59 mmol) of sodium ethoxide and 100 ml of methanol, and 10.0 g (56 mmol) of a diepisulfide compound of the formula (31) was dropwise added over 30 minutes from the dropping funnel in a nitrogen atmosphere while maintaining a temperature of 25° C. or lower. After the completion of the dropwise addition, the mixture was stirred for 3 hours while maintaining a reaction temperature of 25° C. or lower. Then, the solvent was concentrated by decompression, methylene chloride was added, the resultant mixture was washed with diluted hydrochloric acid and water, and the solvent was removed by decompression, to obtain a product. The obtained product was dissolved in mixed solvents of methylene chloride and hexane, the resultant solution was passed through a column filled with silica gel, and then, it was again concentrated under vacuum, thereby obtaining 9.1 g of a compound, which was a colorless transparent liquid, of the formula (47),

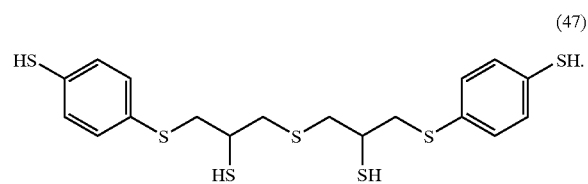

(47)

Analysis results for deciding the structure of the above compound are shown below.

(Elemental analysis) C: measured value 46.9% (calculated value 46.7%), H: measured value 4.8% (calculated value 4.8%), O: measured value 0.2% (calculated value 0.0%), S: measured value 48.1% (calculated value 48.5%), [FD-MS] m/z=463 (M+), [1H-NMR] (solvent: CDCl3) δ=2.07–2.20 (d, 2H), 2.81–2.98(m, 4H), 3.00–3.26 (m, 6H), 3.39–3.46(s, 2H), 7.10–7.36(m, 8H)

Synthesis Example 11

A four-necked 300-ml flask equipped with a stirrer, a thermometer and a dropping funnel was charged with 10.0 g (41 mmol) of a tetrathiol compound of the formula (26), 20.0 g (198 mmol) of triethylamine and 100 ml of methylene chloride, and a mixed solution containing 30.0 g (191 mmol) of chloroethyl mercaptoethyl sulfide and 100 ml of methylene chloride was dropwise added over 60 minutes from the dropping funnel in a nitrogen atmosphere while maintaining a temperature of 0° C. or lower. After the completion of the dropwise addition, the mixture was stirred for 3 hours while maintaining a reaction temperature of 0° C. or lower. Then, the reaction solution was washed with diluted hydrochloric acid and water, and the solvent was removed by decompression, to obtain a product. The obtained product was dissolved in mixed solvents of methylene chloride and hexane, the resultant solution was passed through a column filled with silica gel, and then, it was again concentrated under vacuum, thereby obtaining 15.8 g of a compound, which was a colorless transparent liquid, of the formula (48),

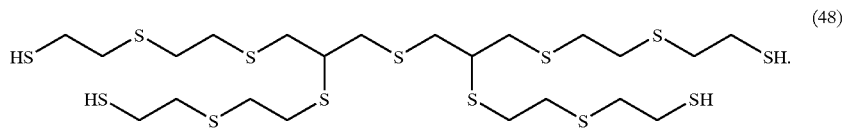

(48)

Analysis results for deciding the structure of the above compound are shown below.

(Elemental analysis) C: measured value 36.5% (calculated value 36.3%), H: measured value 6.5% (calculated value 6.4%), O: measured value 0.2% (calculated value 0.0%), S: measured value 56.8% (calculated value 57.3%), [FD-MS] m/z=727 (M+) (solvent: CDCl3) δ=1.89–1.20 (t, 4H), 2.69–3.63 (m, 42H)

Synthesis Example 12

A four-necked 300-ml flask equipped with a stirrer, a thermometer and a dropping funnel was charged with 10.0 g (41 mmol) of a tetrathiol compound of the formula (26), 20.0 g (198 mmol) of triethylamine and 100 ml of methylene chloride, and a mixed solution containing 30.0 g (207 mmol) of 4-chlorothiophenol and 100 ml of methylene chloride was dropwise added over 60 minutes from the dropping funnel in a nitrogen atmosphere while maintaining a temperature of 0° C. or lower. After the completion of the dropwise addition, the mixture was stirred for 3 hours while maintaining a reaction temperature of 0° C. or lower. Then, the reaction solution was washed with diluted hydrochloric acid and water, and the solvent was removed by decompression, to obtain a product. The obtained product was dissolved in mixed solvents of methylene chloride and hexane, the resultant solution was passed through a column filled with silica gel, and then, it was again concentrated under vacuum, thereby obtaining 13.6 g of a compound, which was a colorless transparent liquid, of the formula (49),

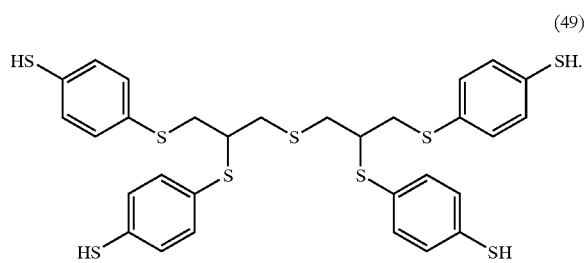
(49)

Analysis results for deciding the structure of the above compound are shown below.
(Elemental analysis) C: measured value 53.1% (calculated value 53.0%), H: measured value 4.5% (calculated value 4.5%), O: measured value 0.1% (calculated value 0.0%), S: measured value 42.3% (calculated value 42.5%), [FD-MS] m/z=679 (M+), [1H-NMR] (solvent: CDCl3) δ=2.83–2.30 (m, 4H), 3.02–3.23 (m, 6H), 3.38–3.45(s, 4H), 7.12–7.35(m, 16H)

Example 41

0.5 part by weight of t-butylperoxyneodecanate was added to a composition composed of 30 parts by weight of a compound (to be referred to as "thiol A" hereinafter) represented by the following formula (50),

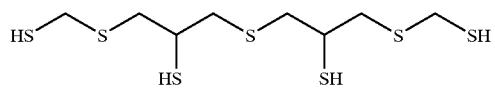
(50)

and 70 parts by weight of divinylbenzene (to be referred to as "DVB" hereinafter), and the mixture was sufficiently stirred. Degassing was carried out by stirring the mixture under a reduced pressure. The degassed mixture was injected into a 2 mm-thick mold composed of two glass plates and a rubber ring. Then, the mixture was temperature-increased from 30° C. to 100° C. at a constant rate over 10 hours, to cure the mixture. The cured mixture was allowed to cool down to room temperature, and then the cured mixture was released from the mold, to obtain a cured product. The obtained cured product was measured for refractive index. Table 6 shows the results thereof.

Examples 42–57

The thiol A used in Example 41 was replaced with a compound (to be referred to as "thiol B" hereinafter) represented by the formula (46), a compound (to be referred to as "thiol C" hereinafter) represented by the following formula (51),

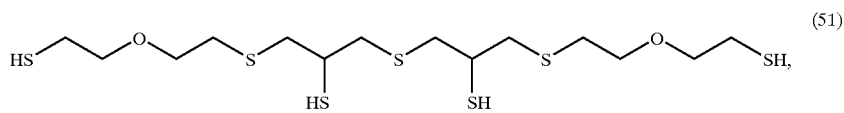
(51)

a compound (to be referred to as "thiol D" hereinafter) represented by the formula (33), a compound (to be referred to as "thiol E" hereinafter) represented by the formula (47), a compound (to be referred to as "thiol F" hereinafter) represented by the formula (52),

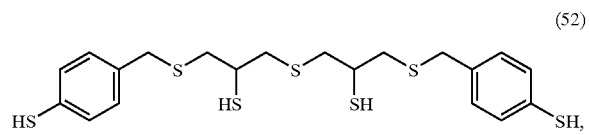
(52)

a compound (to be referred to as "thiol G" hereinafter) represented by the formula (53),

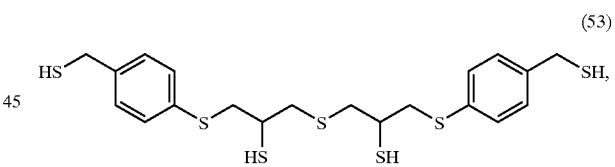
(53)

a compound (to be referred to as "thiol H" hereinafter) represented by the formula (54),

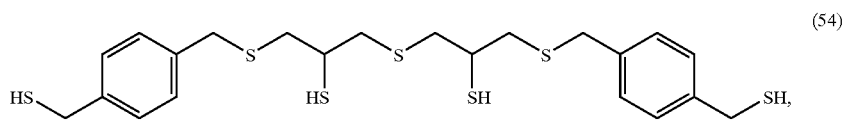
(54)

a compound (to be referred to as "thiol I" hereinafter) represented by the formula (55),

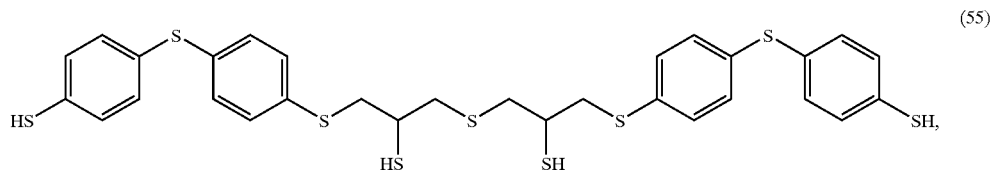

a compound (to be referred to as "thiol J" hereinafter) represented by the formula (56),

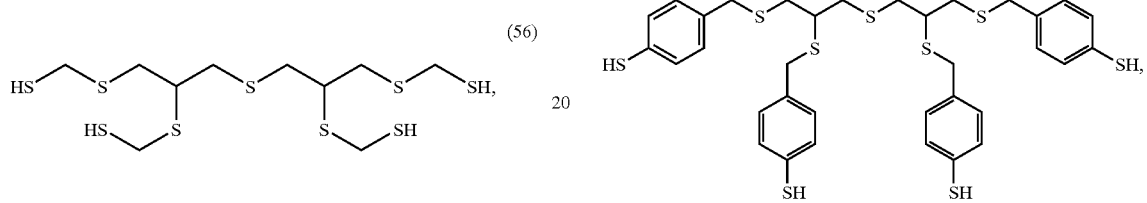

a compound (to be referred to as "thiol K" hereinafter) represented by the formula (48), a compound (to be referred to as "thiol L" hereinafter) represented by the formula (57),

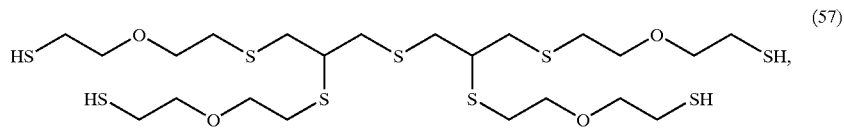

a compound (to be referred to as "thiol M" hereinafter) represented by the formula (49), a compound (to be referred to as "thiol N" hereinafter) represented by the formula (58),

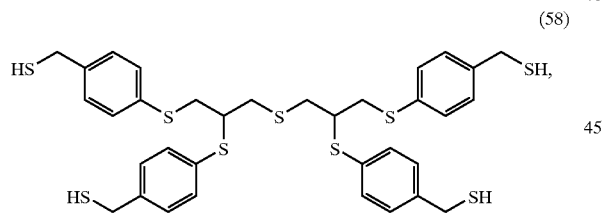

a compound (to be referred to as "thiol O" hereinafter) represented by the formula (59),

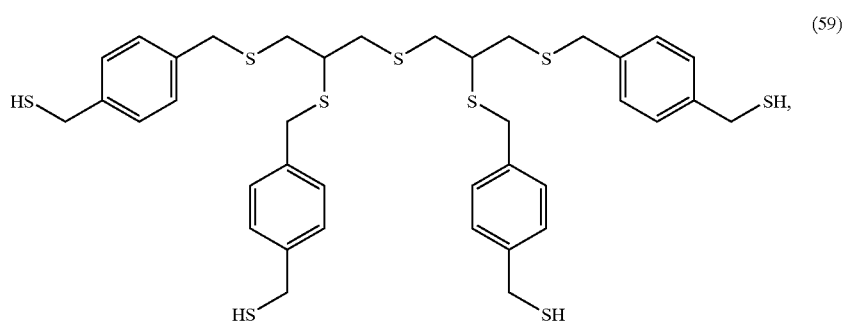

a compound (to be referred to as "thiol P" hereinafter) represented by the formula (60),

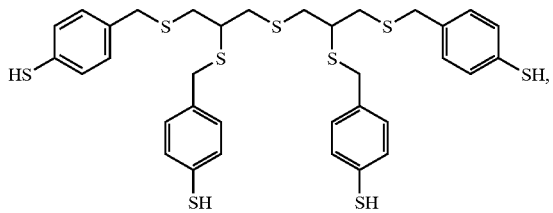

and a compound (to be referred to as "thiol Q" hereinafter) represented by the formula (61),

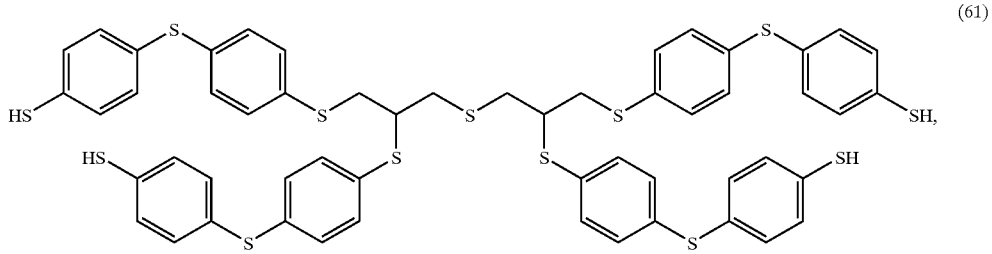

(61)

respectively. Compositions prepared in weight ratios shown in Table 6 were each cured in the same manner as in Example 41, to obtain cured products. Each of the cured products was measured for refractive index. Table 6 shows the results thereof.

Comparative Example 9

The thiol A in Example 41 was replaced with a compound (to be referred to as "4TP" hereinafter) represented by the formula (62), and a composition prepared in a weight ratio shown in Table 6 was cured in the same manner as in Example 41, to obtain a cured product. The obtained cured product was measured for refractive index. Table 6 shows the results thereof.

TABLE 6

| Example | Composition ratio (weight ratio) | Functional group ratio* | Refractive index |
|---|---|---|---|
| 41 | thiol A/DVB = 30/70 | 3.0 | 1.674 |
| 42 | thiol B/DVB = 38/62 | 3.0 | 1.665 |
| 43 | thiol C/DVB = 37/63 | 3.0 | 1.648 |
| 44 | thiol D/DVB = 34/66 | 6.0 | 1.673 |
| 45 | thiol E/DVB = 37/63 | 3.0 | 1.682 |
| 46 | thiol F/DVB = 39/61 | 3.0 | 1.676 |
| 47 | thiol G/DVB = 39/61 | 3.0 | 1.676 |
| 48 | thiol H/DVB = 40/60 | 3.0 | 1.671 |
| 49 | thiol I/DVB = 47/53 | 3.0 | 1.691 |
| 50 | thiol J/DVB = 36/64 | 3.0 | 1.677 |
| 51 | thiol K/DVB = 48/52 | 3.0 | 1.662 |
| 52 | thiol L/DVB = 46/54 | 3.0 | 1.633 |
| 53 | thiol M/DVB = 47/53 | 3.0 | 1.691 |
| 54 | thiol N/DVB = 49/51 | 3.0 | 1.680 |
| 55 | thiol O/DVB = 49/51 | 3.0 | 1.680 |
| 56 | thiol P/DVB = 50/50 | 3.0 | 1.671 |
| 57 | thiol Q/DVB = 59/41 | 3.0 | 1.703 |
| Comparative Example | | | |
| 9 | 4TP/DVB = 39/61 | 3.0 | 1.624 |

*Functional group ratio: ratio of double bond groups to thiol groups

Example 58

0.1 part by weight of tetrabutylphosphonium bromide was added to a composition composed of 24 parts by weight of thiol A and 76 parts by weight of 1,2:6,7-diepithio-4-thiaheptane (to be referred to as "EPS" hereinafter), and the mixture was sufficiently stirred. Degassing was carried out by stirring the mixture under a reduced pressure. The degassed mixture was injected into a 2 mm-thick mold composed of two glass plates and a rubber ring. Then, the mixture was temperature-increased from 30° C. to 100° C. at a constant rate over 10 hours, to cure the mixture. The cured mixture was allowed to cool down to room temperature, and then the cured mixture was released from the mold, to obtain a cured product. The obtained cured product was measured for refractive index. Table 7 shows the results thereof.

Examples 60–74

The thiol A in Example 59 was replaced with thiol B–thiol Q respectively. Compositions prepared in weight ratios shown in Table 7 were each cured in the same manner as in Example 58, to obtain cured products. Each of the cured products was measured for refractive index. Table 7 shows the results thereof.

Comparative Example 10

The thiol A in Example 58 was replaced with 4TP, and a composition prepared in a weight ratio shown in Table 7 was cured in the same manner as in Example 58, to obtain a cured product. The obtained cured product was measured for refractive index. Table 7 shows the results thereof.

TABLE 7

| Example | Composition ratio (weight ratio) | Functional group ratio* | Refractive index |
|---|---|---|---|
| 58 | thiol A/EPS = 24/76 | 3.0 | 1.715 |
| 59 | thiol B/EPS = 31/69 | 3.0 | 1.702 |
| 60 | thiol C/EPS = 30/70 | 3.0 | 1.686 |
| 61 | thiol D/EPS = 27/73 | 6.0 | 1.711 |
| 62 | thiol E/EPS = 30/70 | 3.0 | 1.719 |
| 63 | thiol F/EPS = 31/69 | 3.0 | 1.712 |
| 64 | thiol G/EPS = 31/69 | 3.0 | 1.712 |
| 65 | thiol H/EPS = 33/67 | 3.0 | 1.706 |
| 66 | thiol I/EPS = 39/61 | 3.0 | 1.723 |
| 67 | thiol J/EPS = 29/71 | 3.0 | 1.716 |
| 68 | thiol K/EPS = 41/59 | 3.0 | 1.693 |
| 69 | thiol L/EPS = 38/62 | 3.0 | 1.666 |
| 70 | thiol M/EPS = 39/61 | 3.0 | 1.723 |
| 71 | thiol N/EPS = 41/59 | 3.0 | 1.711 |
| 72 | thiol O/EPS = 41/59 | 3.0 | 1.711 |
| 73 | thiol P/EPS = 43/57 | 3.0 | 1.700 |
| 74 | thiol Q/EPS = 51/49 | 3.0 | 1.728 |
| Comparative Example | | | |
| 10 | 4TP/EPS = 31/69 | 3.0 | 1.662 |

*Functional group ratio: ratio of episulfide rings to thiol groups

Example 75

0.1 part by weight dibutyltin dilaurate and 0.1 part by weight of dioctyl phosphoric acid as a internal mold release agent were added to a composition composed of 47 parts by weight of thiol A and 53 parts by weight of m-xylylene diisocyanate (to be referred to as "XDI" hereinafter), and the mixture was stirred sufficiently. Degassing was carried out by stirring the mixture under a reduced pressure. The degassed mixture was injected into a 2 mm-thick mold composed of two glass plates and a rubber ring. Then, the mixture was temperature-increased from 30° C. to 100° C. at a constant rate over 10 hours, to cure the mixture. The cured mixture was allowed to cool down to room temperature, and then the cured mixture was released from the mold, to obtain a cured product. The obtained cured product was measured for refractive index. Table 8 shows the results thereof.

Examples 76–91

The thiol A in Example 75 was replaced with thiol B thiol Q respectively. Compositions prepared in weight ratios shown in Table 8 were each cured in the same manner as in Example 75, to obtain cured products. Each of the cured products was measured for refractive index. Table 8 shows the results thereof.

Comparative Example 11

The thiol A in Example 75 was replaced with 4TP, and a composition prepared in a weight ratio shown in Table 8 was cured in the same manner as in Example 75, to obtain a cured product. The obtained cured product was measured for refractive index. Table 8 shows the results thereof.

TABLE 8

| Example | Composition ratio (weight ratio) | Functional group ratio* | Refractive index |
|---|---|---|---|
| 75 | thiol A/XDI = 47/53 | 1.0 | 1.688 |
| 76 | thiol B/XDI = 56/44 | 1.0 | 1.668 |
| 77 | thiol C/XDI = 55/45 | 1.0 | 1.635 |
| 78 | thiol D/XDI = 68/32 | 1.0 | 1.705 |
| 79 | thiol E/XDI = 55/45 | 1.0 | 1.702 |
| 80 | thiol F/XDI = 57/43 | 1.0 | 1.689 |
| 81 | thiol G/XDI = 57/43 | 1.0 | 1.689 |
| 82 | thiol H/XDI = 58/58 | 1.0 | 1.677 |
| 83 | thiol I/XDI = 64/36 | 1.0 | 1.712 |
| 84 | thiol J/XDI = 53/47 | 1.0 | 1.693 |
| 85 | thiol K/XDI = 66/34 | 1.0 | 1.661 |
| 86 | thiol L/XDI = 64/36 | 1.0 | 1.612 |
| 87 | thiol M/XDI = 64/36 | 1.0 | 1.612 |
| 88 | thiol N/XDI = 66/34 | 1.0 | 1.692 |
| 89 | thiol O/XDI = 66/34 | 1.0 | 1.692 |
| 90 | thiol P/XDI = 68/32 | 1.0 | 1.676 |
| 91 | thiol Q/XDI = 75/25 | 1.0 | 1.723 |
| Comparative Example | | | |
| 11 | 4TP/XDI = 57/43 | 1.0 | 1.590 |

*Functional group ratio: ratio of isocyanate groups to thiol groups

Example 92

3 parts by weight of 2,2-dimethoxy-2-phenylacetophenone was added to a composition composed of 30 parts by weight of thiol A and 70 parts by weight of DVB and stirred sufficiently. Degassing was carried out by stirring the mixture under a reduced pressure. The degassed mixture was injected into a 2 mm-thick mold composed of two glass plates and a rubber ring. Then, the mixture was irradiated with light of a 100 W/cm metal halide lamp at a distance of 30 cm from the light source for 60 minutes, thereby curing the mixture. The cured mixture was allowed to cool down to room temperature, and then the cured mixture was released from the mold, to obtain a cured product. The obtained cured product was measured for refractive index and pencil hardness. Table 9 shows the results thereof.

Examples 93–108

The thiol A in Example 92 was replaced with thiol B–thiol Q respectively. Compositions prepared in weight ratios shown in Table 9 were each cured in the same manner as in Example 92, to obtain cured products. Each of the cured products was measured for refractive index. Table 9 shows the results thereof.

Comparative Example 12

The thiol A in Example 92 was replaced with 4TP, and a composition prepared in a weight ratio shown in Table 9 was cured in the same manner as in Example 92, to obtain a cured product. The obtained cured product was measured for refractive index. Table 9 shows the results thereof.

TABLE 9

| Example | Composition ratio (weight ratio) | Functional group ratio* | Refractive index |
|---|---|---|---|
| 92 | thiol A/DVB = 30/70 | 3.0 | 1.674 |
| 93 | thiol B/DVB = 38/62 | 3.0 | 1.665 |
| 94 | thiol C/DVB = 37/63 | 3.0 | 1.648 |
| 95 | thiol D/DVB = 34/66 | 6.0 | 1.673 |
| 96 | thiol E/DVB = 37/63 | 3.0 | 1.682 |
| 97 | thiol F/DVB = 39/61 | 3.0 | 1.676 |
| 98 | thiol G/DVB = 39/61 | 3.0 | 1.676 |
| 99 | thiol H/DVB = 40/60 | 3.0 | 1.671 |
| 100 | thiol I/DVB = 47/53 | 3.0 | 1.691 |
| 101 | thiol J/DVB = 36/64 | 3.0 | 1.677 |
| 102 | thiol K/DVB = 48/52 | 3.0 | 1.662 |
| 103 | thiol L/DVB = 46/54 | 3.0 | 1.633 |
| 104 | thiol M/DVB = 47/53 | 3.0 | 1.691 |
| 105 | thiol N/DVB = 49/51 | 3.0 | 1.680 |
| 106 | thiol O/DVB = 49/51 | 3.0 | 1.680 |
| 107 | thiol P/DVB = 50/50 | 3.0 | 1.671 |
| 108 | thiol Q/DVB = 59/41 | 3.0 | 1.703 |
| Comparative Example | | | |
| 12 | 4TP/DVB = 39/61 | 3.0 | 1.624 |

*Functional group ratio: ratio of double bond groups to thiol groups

What is claimed is:

1. A photocurable composition containing 3,3'-thiobis(propane-1,2-dithiol) of the formula (1),

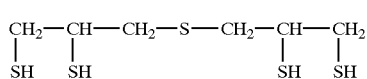

(1)

one or more enic compounds and one or more photoradical polymerization initiators.

2. A photocurable composition according to claim 1, wherein the one or more enic compounds contain one or more compounds represented by the formula (2),

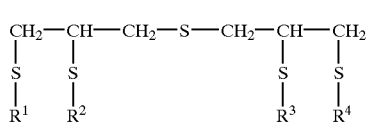

(2)

(in which each of $R^1$ to $R^4$ is a hydrogen atom or any one group in the formula (3),

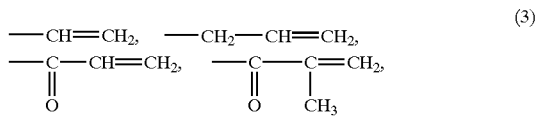
(3)

provided that at least two of $R^1$ to $R^4$ are any one group in the formula (3)).

3. A photocurable composition according to claim 2, wherein one or two of $R^1$ to $R^4$ in the formula (2) represent a group of the formula (4),

(4)

in which R is a hydrogen atom or an alkyl group having 1 to 5 carbon atoms, provided that $R^1$ and $R^2$ or $R^3$ and $R^4$ do not represent a group of the formula (4) simultaneously.

4. A photocurable composition according to claim 1, wherein the one or more enic compounds contain divinylbenzene and/or bis(4-methacryloylthiophenyl)sulfide represented by the formula (5),

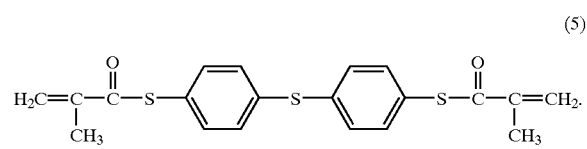
(5)

5. A cured product obtained from the photocurable composition recited in claim 1.

6. An optical material formed of the cured product recited in claim 5.

7. A method of preparing the cured product of claim 5, wherein said method comprises placing the photocurable composition in a mold, and subjecting it to photocuring.

8. The method according to claim 7, wherein the mold is in the form of spectacle ends, prism, an optical fiber, an information recording substrate or a filter.

* * * * *